US010862384B2

(12) United States Patent
Ishizaka

(10) Patent No.: US 10,862,384 B2
(45) Date of Patent: Dec. 8, 2020

(54) LINEAR ACTUATOR

(71) Applicant: Panasonic Intellectual Property Management Co., Ltd., Osaka (JP)

(72) Inventor: Katsushi Ishizaka, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 16/295,609

(22) Filed: Mar. 7, 2019

(65) Prior Publication Data

US 2019/0207502 A1 Jul. 4, 2019

Related U.S. Application Data

(63) Continuation of application No. PCT/JP2017/037103, filed on Oct. 13, 2017.

(30) Foreign Application Priority Data

Oct. 18, 2016 (JP) .................. 2016-204518

(51) Int. Cl.
*H02K 33/18* (2006.01)
*H02K 41/035* (2006.01)
*G02B 7/04* (2006.01)
*H04N 5/225* (2006.01)
*H02K 11/21* (2016.01)

(52) U.S. Cl.
CPC .............. *H02K 33/18* (2013.01); *G02B 7/04* (2013.01); *H02K 41/0356* (2013.01);
(Continued)

(58) Field of Classification Search
CPC ........ H02K 33/18; H02K 33/00; H02K 33/02; H02K 33/04; H02K 33/06; H02K 33/08;
(Continued)

(56) References Cited

U.S. PATENT DOCUMENTS

| 4,326,786 A | 4/1982 | Uchiyama et al. |
| 6,141,300 A * | 10/2000 | Getreuer ............ G11B 7/08582 369/44.14 |

(Continued)

FOREIGN PATENT DOCUMENTS

| JP | 62-210854 A | 9/1987 |
| JP | 63-178755 | 7/1988 |

(Continued)

OTHER PUBLICATIONS

Ito Yoshihiro, Lens Barrel and Optical Device, Sep. 12, 2013, Nikon Corp, JP 2013182165 (English Machine Translation) (Year: 2013).*

(Continued)

*Primary Examiner* — Quyen P Leung
*Assistant Examiner* — Alexander A Singh
(74) *Attorney, Agent, or Firm* — Renner, Otto, Boisselle & Sklar, LLP

(57) ABSTRACT

A linear actuator includes: a coil that is movably provided; a coil yoke that is provided to move integrally with the coil; a first side yoke portion that extends outside of the coil; a second side yoke portion that is surrounded by the coil, extends, and is opposed to the first side yoke portion; and a magnet that forms a magnetic field between the first side yoke portion and the second side yoke portion. The coil yoke extends along an axis of the coil. The first side yoke portion and the second side yoke portion have a first hold portion and a second hold portion, the support portion supporting the coil yoke in a stop position and having magnetic polarities.

21 Claims, 28 Drawing Sheets

(52) U.S. Cl.
CPC ......... *H04N 5/2254* (2013.01); *H04N 5/2257* (2013.01); *H02K 11/21* (2016.01)

(58) Field of Classification Search
CPC ........ H02K 33/10; H02K 33/12; H02K 33/14; H02K 33/16; H02K 35/02; H02K 11/21; H04N 5/2257; H04N 5/2254; G02B 7/04; G02B 7/02; G02B 7/10; G02B 7/21; G03B 9/18; G03B 9/08; G03B 9/10
USPC ......... 310/12.01, 12.02, 12.04, 12.05, 12.06, 310/12.07, 12.08, 12.09, 12.11, 12.12, 310/12.13, 12.14, 12.15, 12.16, 12.17, 310/12.18, 12.19, 12.21, 12.24
See application file for complete search history.

(56) References Cited

U.S. PATENT DOCUMENTS

| | | |
|---|---|---|
| 2005/0180275 A1 | 8/2005 | Shiraki et al. |
| 2007/0216799 A1 | 9/2007 | Honma |
| 2008/0272659 A1 | 11/2008 | Jeong et al. |

FOREIGN PATENT DOCUMENTS

| | | | |
|---|---|---|---|
| JP | 10-112967 | | 4/1998 |
| JP | 2005-242094 | | 9/2005 |
| JP | 2006-054970 | | 2/2006 |
| JP | 2007-248844 | | 9/2007 |
| JP | 2009-515293 | | 4/2009 |
| JP | 2013-182165 A | | 9/2013 |
| JP | 2013182165 A | * | 9/2013 |
| WO | 2007/049920 | | 5/2007 |

OTHER PUBLICATIONS

International Search Report of PCT application No. PCT/JP2017/037103 dated Jan. 9, 2018.

The Extended European Search Report dated Sep. 30, 2019 for the related European Patent Application No. 17861726.2.

* cited by examiner

LINEAR ACTUATOR

TECHNICAL FIELD

The present disclosure relates to a linear actuator.

BACKGROUND ART

PTL 1 discloses a linear drive device that includes a magnet and a coil holding a magnetic body configured to form a magnetic attractive force between the magnet and the coil. The coil is a mover in the linear drive device and is moved linearly along the magnet under the attractive force, by an electromagnetic force excited by a magnetic field formed by an electric current flown into the coil and the magnet.

CITATION LIST

Patent Literature

PTL 1: Unexamined Japanese Patent Publication No. 2005-242094

SUMMARY OF THE INVENTION

The present disclosure is intended to provide a linear actuator that improves performance for holding a mover in a stop state.

A linear actuator in an aspect of the present disclosure includes: a coil that is movably provided; a magnetic body that is provided to move integrally with the coil; a first yoke that extends outside of the coil; a second yoke that is surrounded by the coil, extends, and is opposed to the first yoke; and a magnet that forms a magnetic field between the first yoke and the second yoke. The magnetic body extends along an axis of the coil, and at least one of the first yoke and the second yoke has a support portion that supports the magnetic body in a stop state and has a magnetic polarity.

According to the linear actuator in the present disclosure, it is possible to improve the performance for holding the mover in the stop state.

DESCRIPTION OF EMBODIMENTS

Exemplary embodiments will be described below in detail with reference to the drawings as appropriate. However, unnecessary detailed descriptions may be omitted. For example, detailed descriptions of already known matter and duplicated descriptions of significantly identical components may be omitted. This is intended to avoid unnecessary redundant descriptions to allow persons skilled in the art to understand the following descriptions in an easy manner. In the following descriptions of the exemplary embodiments, some expressions with the term "approximately" may be used such as "approximately parallel" and "approximately orthogonal". For example, the expression "approximately parallel" means not only a fully parallel state but also a significantly parallel state, that is, a state including a difference of about several %, for example. The same thing applies to other expressions with the term "approximately". The inventor provides the accompanying drawings and the following descriptions for persons skilled in the art to fully understand the present disclosure and do not intend to limit the subject matter described in the appended claims by this provision.

First Exemplary Embodiment 1-1. Configuration of a Linear Actuator According to a First Exemplary Embodiment A configuration of linear actuator 100 according to the first exemplary embodiment will be described with reference to the drawings. Referring to FIGS. 1 to 4, linear actuator 100 includes coil 40 as a mover and operates coil 40 linearly. For example, linear actuator 100 linearly moves a movement target object integrally attached to coil 40 together with coil 40.

Figure 1:
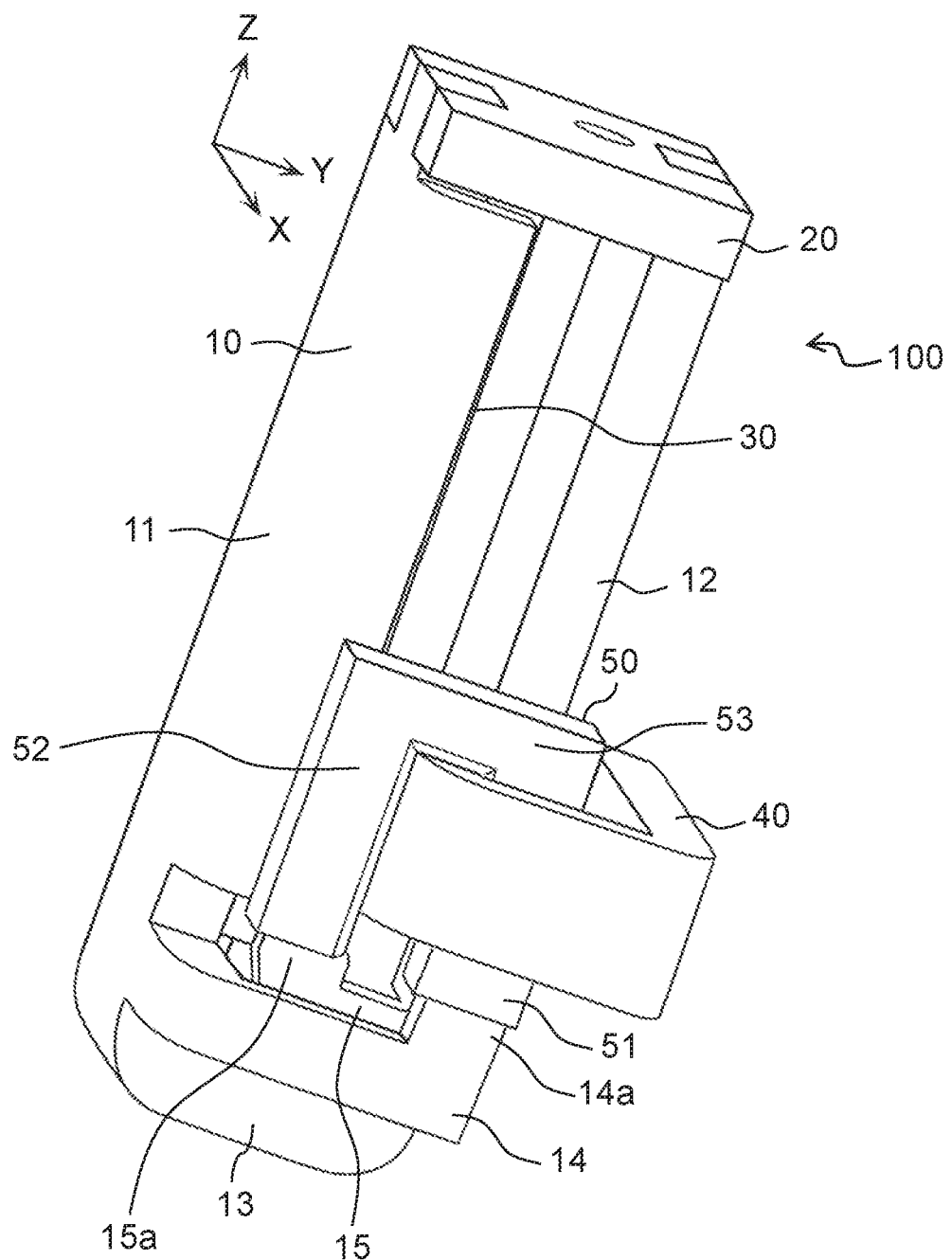
FIG. 1 is a schematic perspective view of an outer appearance of a linear actuator according to a first exemplary embodiment.
Figure 2:
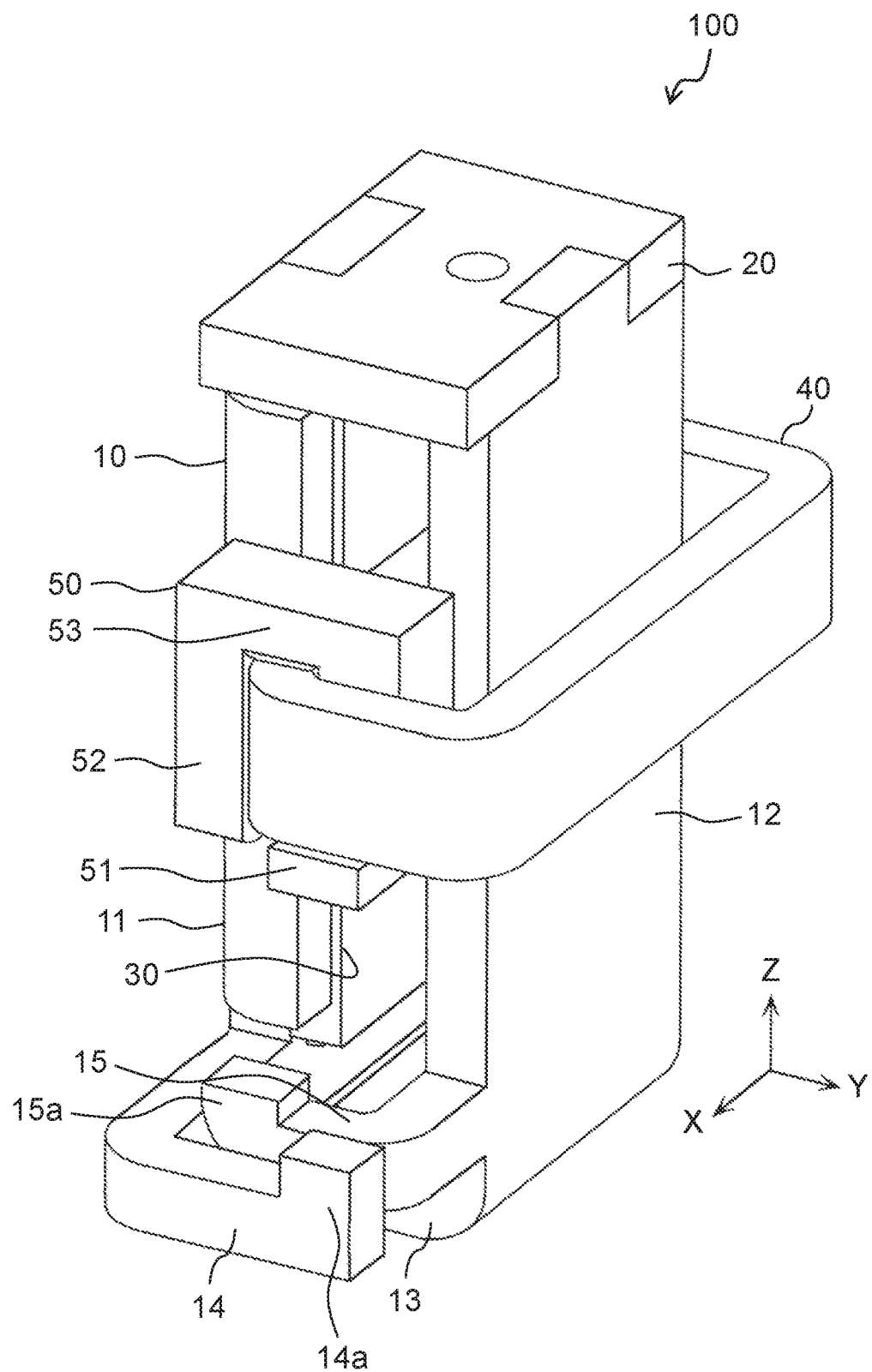
FIG. 2 is a perspective view of the linear actuator illustrated in FIG. 1 as seen from another direction.
Figure 3:
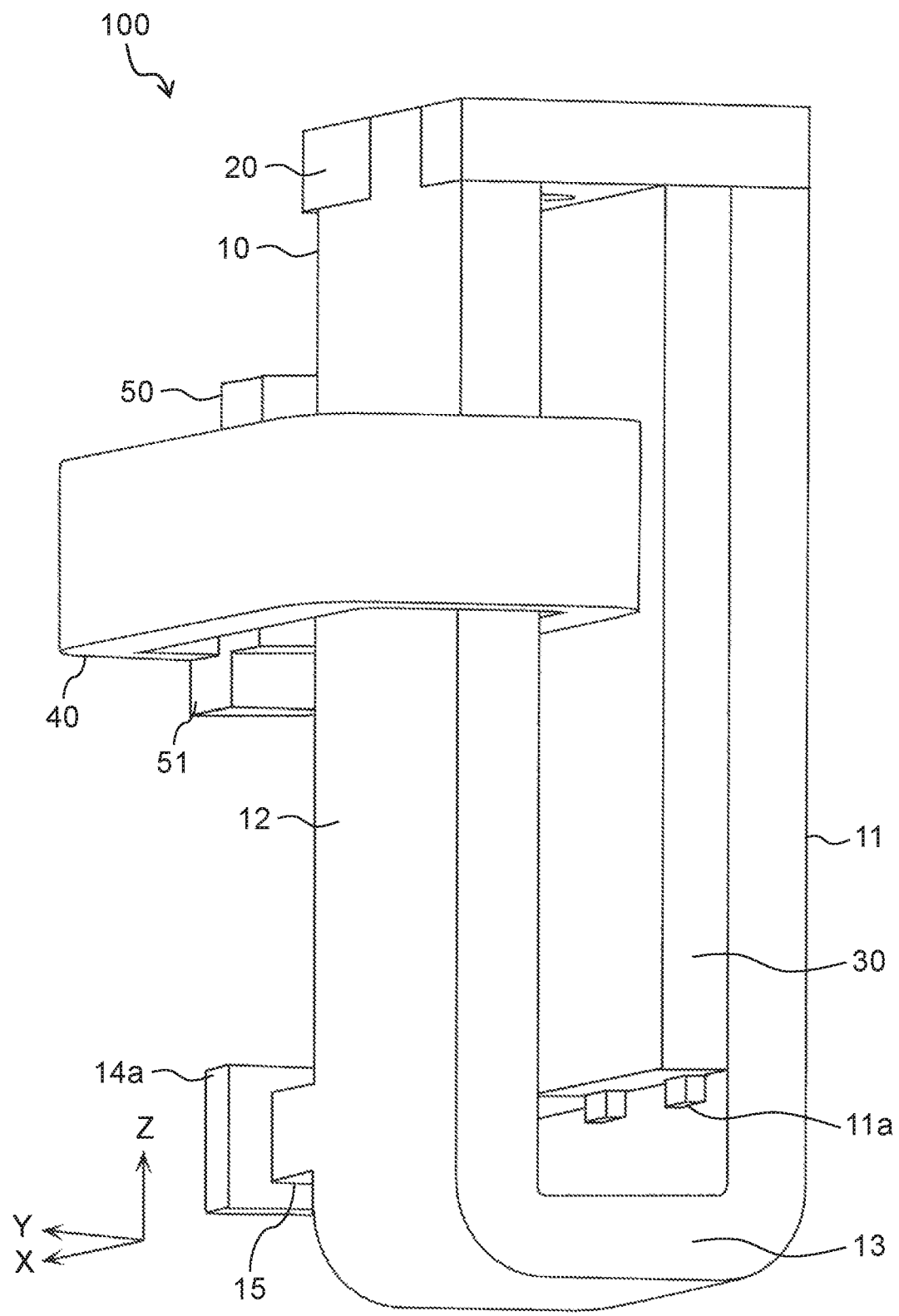
FIG. 3 is a perspective view of the linear actuator illustrated in FIG. 1 as seen from a rear side.
Figure 4:
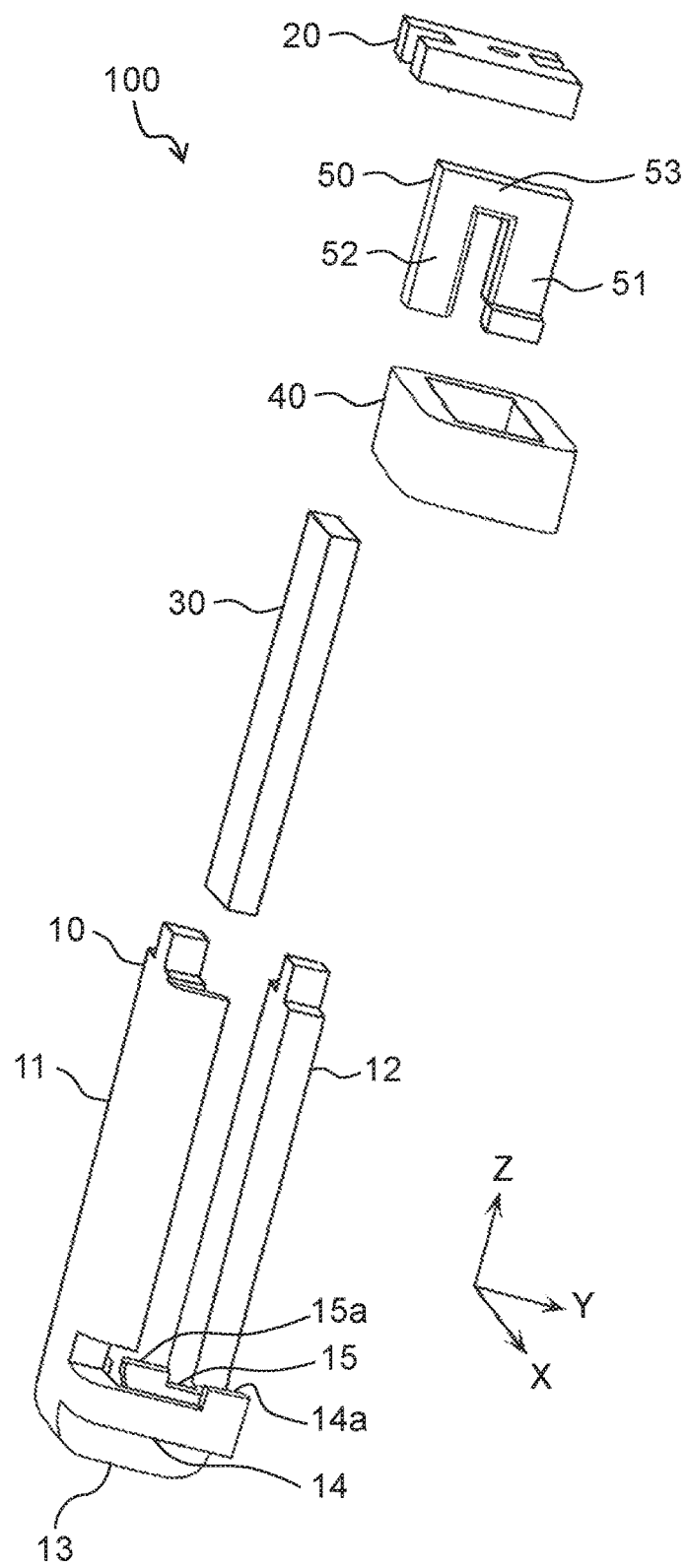
FIG. 4 is an exploded perspective view of the linear actuator illustrated in FIG. 1.

FIG. 1 is a schematic perspective view of an outer appearance of linear actuator 100 according to the first exemplary embodiment. FIG. 2 is a perspective view of linear actuator 100 illustrated in FIG. 1 as seen from another direction. FIG. 3 is a perspective view of linear actuator 100 illustrated in FIG. 1 as seen from a rear side. FIG. 4 is an exploded perspective view of linear actuator 100 illustrated in FIG. 1.

FIG. 1 illustrates a state in which the coil as a mover is held in a stop position, and FIGS. 2 and 3 illustrate a state in which the coil is separated from the stop position.

Linear actuator 100 includes main yoke 10 and sub yoke 20 coupled to each other, magnet 30 fixedly provided on main yoke 10, coil 40 provided to be movable with respect to main yoke 10, and coil yoke 50 provided integrally with coil 40. Main yoke 10, sub yoke 20, and coil yoke 50 are produced from a magnetic material. Main yoke 10 and sub yoke 20 can be separated from each other and are connected together at time of manufacture of linear actuator 100.

Main yoke 10 is formed in a U groove shape by bending a plate material in an elongated U shape. The method for manufacturing main yoke 10 is not limited to a method by to bend a plate material but may be any manufacturing method such as casting, forging, cutting, or pressing. Main yoke 10 integrally includes bottom yoke portion 13 constituting a U-shaped bottom, and first side yoke portion 11 and second side yoke portion 12 in a linear form constituting U-shaped opposed side portions.

In the present exemplary embodiment, first side yoke portion 11 and second side yoke portion 12 extend in approximately parallel to each other. Main yoke 10 further includes first hold portion 14 that extends in an L arm shape from a base portion of first side yoke portion 11 on the bottom yoke portion 13 side and second hold portion 15 that extends in an L arm shape from a base portion of second side yoke portion 12 on the bottom yoke portion 13 side, integrally with first side yoke portion 11 and second side yoke portion 12.

First hold portion 14 and second hold portion 15 are close to each other but are not in contact with each other. First hold portion 14 and second hold portion 15 are disposed with a space between first hold portion 14 and second hold portion 15. There exists a gap between first hold portion 14 and second hold portion 15. In this example, first side yoke portion 11 and second side yoke portion 12 are respective examples of a first yoke and a second yoke. First hold portion 14 and second hold portion 15 are respective examples of a first support portion and a second support portion.

Second hold portion 15 protrudes in a direction perpendicular to a direction in which first side yoke portion 11 and second side yoke portion 12 are aligned and extends to a position opposed to first side yoke portion 11 in a direction from second side yoke portion 12 to first side yoke portion 11. Second hold portion 15 integrally includes at a front end second support end portion 15a protruding to a direction opposite to bottom yoke portion 13.

In the present exemplary embodiment, second hold portion 15 and second support end portion 15a are produced from the same material as that for main yoke 10 to form one continuous member together with main yoke 10.

First hold portion 14 protrudes in the same direction as second hold portion 15, extends in a direction from first side yoke portion 11 to second side yoke portion 12 to cover second hold portion 15 from the outside, and reaches a position opposed to second side yoke portion 12. First hold portion 14 includes at a front end first support end portion 14a protruding to a side opposite to bottom yoke portion 13.

In the present exemplary embodiment, first hold portion 14 and first support end portion 14a are produced from the same material as that for main yoke 10 to form one continuous member together with main yoke 10. First hold portion 14 and first support end portion 14a, and second hold portion 15 and second support end portion 15a may constitute a member separated from main yoke 10 and connected to main yoke 10 as far as magnetic flux flows between these portions and main yoke 10. First support end portion 14a and second support end portion 15a are opposed to second side yoke portion 12 and first side yoke portion 11 in a direction orthogonal to a direction in which first side yoke portion 11 and second side yoke portion 12 are aligned.

Sub yoke 20 has a rectangular plate shape. Sub yoke 20 is coupled to respective ends of first side yoke portion 11 and second side yoke portion 12 of main yoke 10. Sub yoke 20 physically and magnetically connects first side yoke portion 11 and second side yoke portion 12.

In this case, a Z axis is set to a direction in which first side yoke portion 11 and second side yoke portion 12 extend, and a Z axis positive direction is defined as a direction from main yoke 10 to sub yoke 20. In addition, a Y axis is set to a direction from first side yoke portion 11 to second side yoke portion 12 and orthogonal to the Z axis, and a direction from first side yoke portion 11 to second side yoke portion 12 is defined as Y axis positive direction. Further, an X direction is set to a direction in which first hold portion 14 and second hold portion 15 protrude from first side yoke portion 11 and second side yoke portion 12 and perpendicular to the Y axis and the Z axis, and the protruding direction is defined as X axis positive direction. Hereinafter, the directions will also be described using the X axis, the Y axis, and the Z axis.

Magnet 30 has an elongated flat plate shape and is attached and fixed to the surface of first side yoke portion 11 opposed to second side yoke portion 12 in the Y axis direction. Magnet 30 constitutes a stator of linear actuator 100. Magnet 30 is positioned in the Z axis direction as longitudinal direction of first side yoke portion 11 by a plurality of positioning projections 11a (in particular, see FIG. 3) formed on the surface of first side yoke portion 11 and is attached to first side yoke portion 11. Projections 11a are disposed on the surface of first side yoke portion 11 near bottom yoke portion 13. Accordingly, magnet 30 can be disposed with a longer side oriented in the Z axis direction.

Magnet 30 has an N pole and an S pole that generate a bipolar magnetic field. For example, magnet 30 is formed from a permanent magnet. Magnet 30 is opposed to second side yoke portion 12 over almost entire second side yoke portion 12 in the longitudinal direction. The longitudinal direction of second side yoke portion 12 is a direction in which second side yoke portion 12 linearly extends in the Z axis direction.

In the present exemplary embodiment, magnet 30 has an N magnetic polarity on a flat surface opposed to second side yoke portion 12, and has an S magnetic polarity on a surface that is positioned on the side opposite to the surface with the N magnetic polarity and is in abutment with first side yoke portion 11.

In a gap between first side yoke portion 11 and second side yoke portion 12, magnetic flux is formed in the Y axis positive direction from first side yoke portion 11 to second side yoke portion 12. In addition, in a gap between first hold portion 14 and second hold portion 15, magnetic flux is formed from second hold portion 15 to first hold portion 14. Accordingly, first support end portion 14a of first hold portion 14 has an S magnetic polarity, and second support end portion 15a of second hold portion 15 has an N magnetic polarity. At this time, it is considered that a magnetic line at sub yoke 20 is oriented in a Y axis negative direction and a magnetic line at bottom yoke portion 13 is oriented in the Y axis negative direction. A side surface of magnet 30 on the Z axis side is desirably brought as close to sub yoke 20 as possible to contact with sub yoke 20.

Coil 40 has an outer shape of a rectangular cylinder. Coil 40 is formed from a winding wire that is wound along an outer peripheral direction of the rectangular cylinder. Coil 40 is disposed such that second side yoke portion 12 is passed through the rectangular cylinder to surround second side yoke portion 12. Coil 40 is disposed with an axial direction approximately parallel to longitudinal direction of second side yoke portion 12, and is movable in the longitudinal direction with reference to second side yoke portion 12, that is, in the Z axis direction. Coil 40 is disposed such that one of four flat side portions constituting the rectangular cylinder is positioned between first side yoke portion 11 and second side yoke portion 12. The axial direction of coil 40 is an axis center direction of the rectangular cylinder and a winding axis direction of the winding wire.

Coil yoke 50 has a U outer shape as seen from front side of the X axis direction. Coil yoke 50 is attached to the rectangular cylinder of coil 40 in such a manner as to move integrally with coil 40. Coil yoke 50 is disposed adjacent to first side yoke portion 11 and second side yoke portion 12 on the X axis positive direction side. Coil yoke 50 is disposed to cross coil 40 from inside to outside on the Z axis positive direction side opposite to first hold portion 14 and second hold portion 15. In this example, coil yoke 50 is an example of a magnetic body.

Specifically, bottom portion 53 constituting a U-shaped bottom portion of coil yoke 50 is adjacent to an end of coil 40 on the Z axis positive direction side. Further, in the present exemplary embodiment, bottom portion 53 extends crossing coil 40 in Y axis direction. Out of first leg portion 51 and second leg portion 52 constituting opposed side portions of U shape of coil yoke 50, first leg portion 51 is opposed to second side yoke portion 12 and has an L shape. First leg portion 51 extends from bottom portion 53 through an inside of coil 40 in the axis direction of coil 40, and bends and extends toward first support end portion 14a in the X axis positive direction. Second leg portion 52 extends linearly in the axis direction of coil 40, passing from bottom portion 53 through an outside of coil 40, at a position opposed to first side yoke portion 11.

When coil yoke 50 moves together with coil 40 toward first hold portion 14 and second hold portion 15 in a direction along second side yoke portion 12 as the axial direction of coil 40, an end of first leg portion 51 abuts with first support end portion 14a of first hold portion 14 and an end of second leg portion 52 abuts with second support end portion 15a of second hold portion 15. In this case, first leg portion 51 and second leg portion 52 are configured to abut with first support end portion 14a and second support end portion 15a at the same time. Coil yoke 50 does not contact first hold portion 14 and second hold portion 15 except for first support end portion 14a and second support end portion 15a protruding in the Z axis positive direction.

1-2. Operations of the Linear Actuator According to the First Exemplary Embodiment Operations of linear actuator 100 according to the first exemplary embodiment will be described below with reference to FIGS. 5 to 8.

Figure 5:
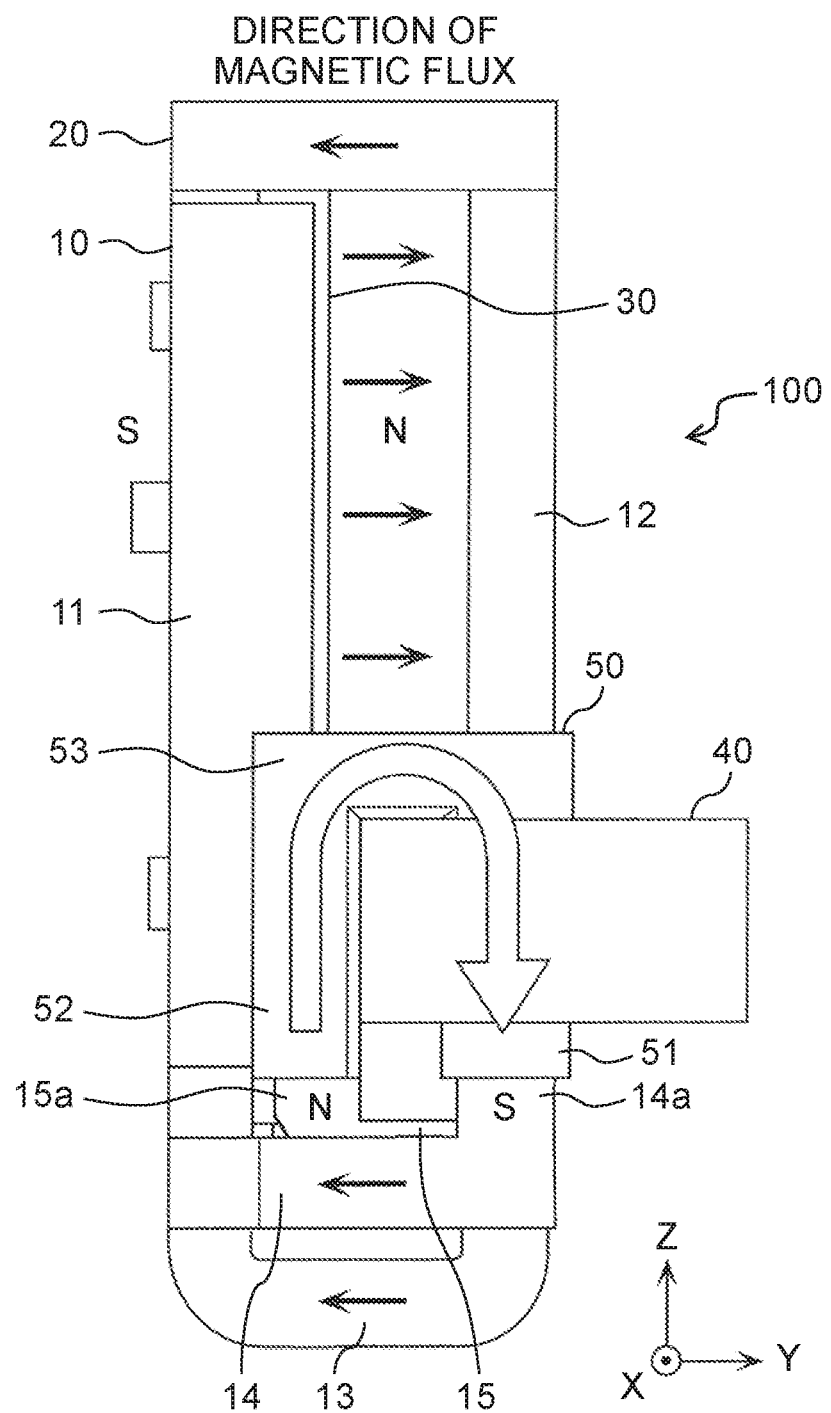
FIG. 5 is a side view of the linear actuator illustrated in FIG. 1, illustrating a state in which a coil as a mover is held by first and second hold portions.
Figure 6:
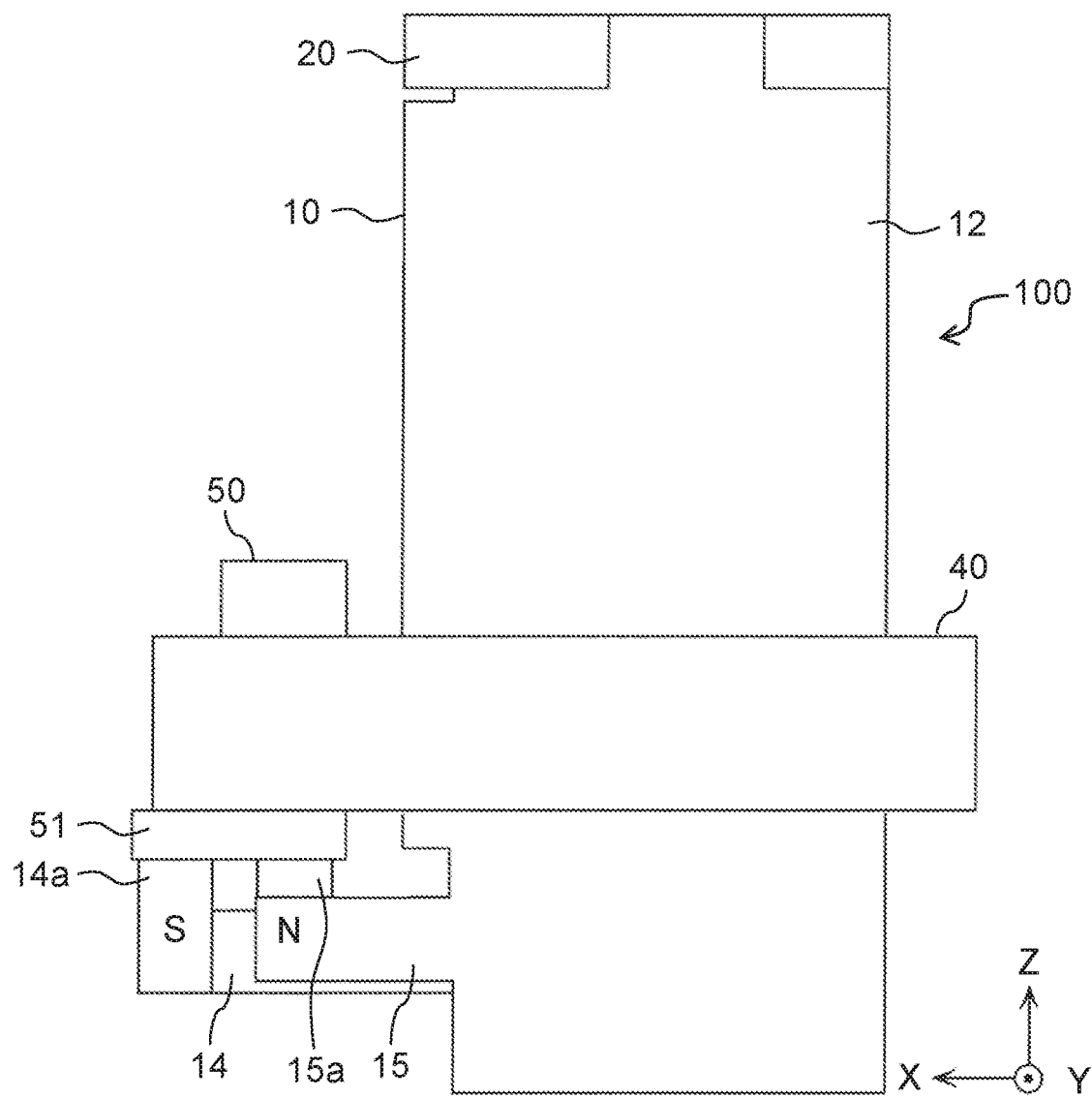
FIG. 6 is a side view of the linear actuator illustrated in FIG. 5 as seen from another direction.
Figure 7:
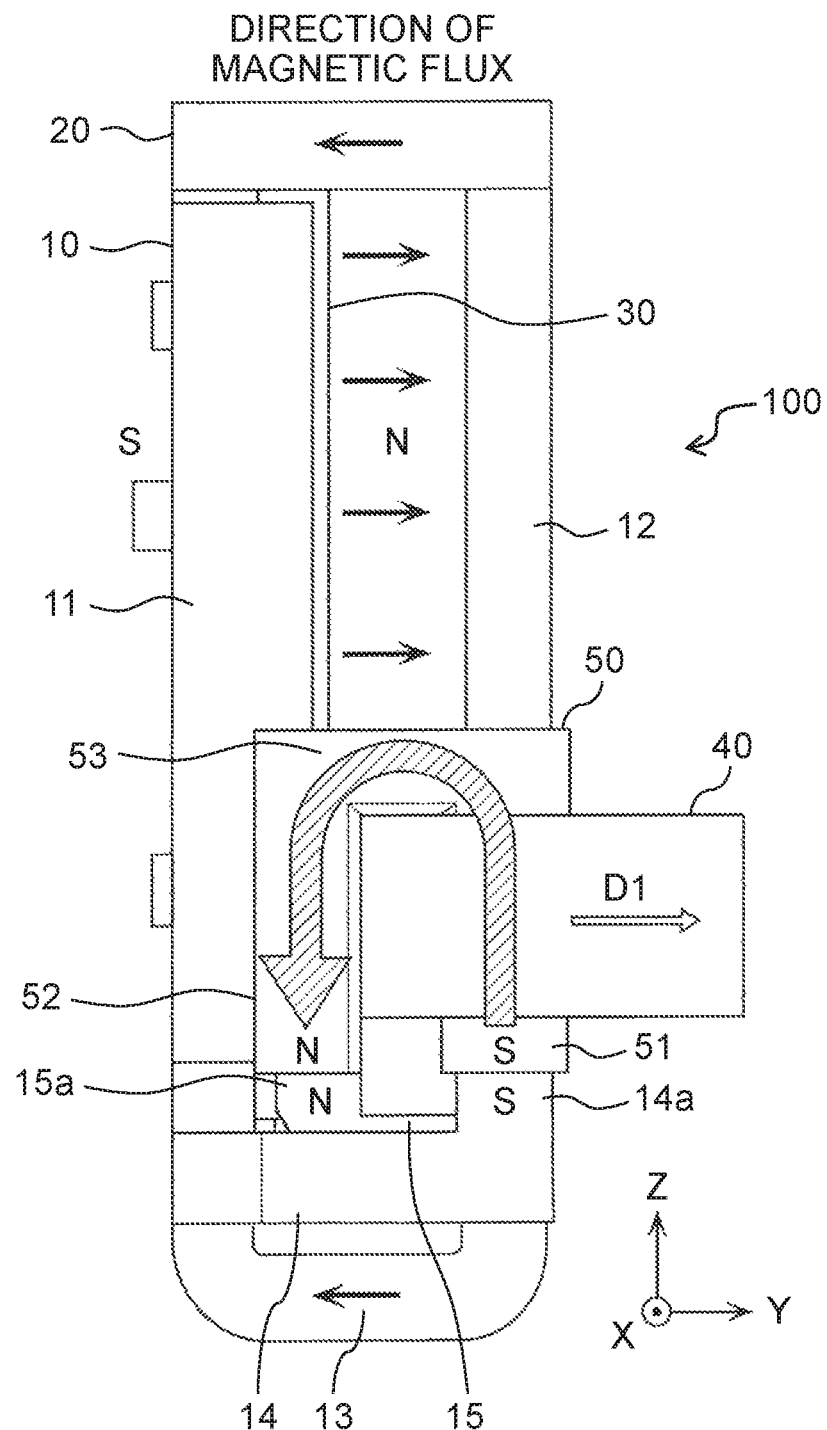
FIG. 7 is a side view of the linear actuator illustrated in FIG. 5, illustrating a state in which an electric current is flown into the coil.
Figure 8:
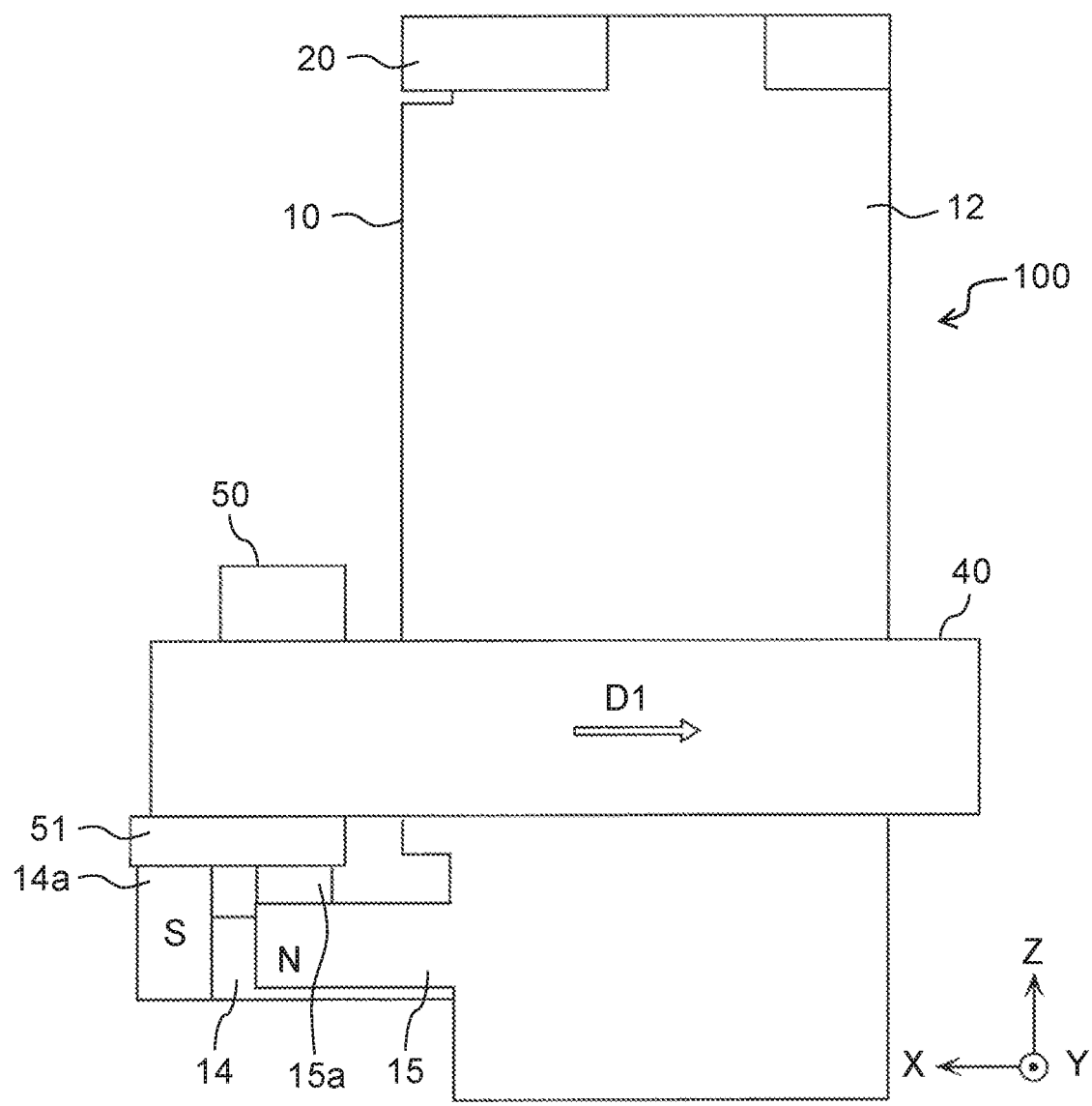
FIG. 8 is a side view of the linear actuator illustrated in FIG. 7 from the same direction as that in FIG. 6.

FIG. 5 is a side view of linear actuator 100 illustrated in FIG. 1 as seen from the X axis positive direction to the X axis negative direction, illustrating a state in which coil 40 as a mover is held by first hold portion 14 and second hold portion 15. FIG. 6 is a side view of linear actuator 100 illustrated in FIG. 5 as seen from the Y axis positive direction as another direction to the Y axis negative direction. FIG. 7 is a side view of linear actuator 100 illustrated in FIG. 5, illustrating a state in which an electric current is flown into coil 40. FIG. 8 is a side view of linear actuator 100 illustrated in FIG. 7 as seen from the same direction as that illustrated in FIG. 6.

Referring to FIGS. 5 and 6, in linear actuator 100, coil 40 stops in a state in which first leg portion 51 and second leg portion 52 of coil yoke 50 are in abutment with first support end portion 14a of first hold portion 14 and second support end portion 15a of second hold portion 15 at the same time. The positions of coil yoke 50 and coil 40 in the stop state in abutment with first support end portion 14a and second support end portion 15a are the stop positions of coil yoke 50 and coil 40 set in linear actuator 100. Coil yoke 50 in the stop position is supported and held by first support end portion 14a of first hold portion 14 and second support end portion 15a of second hold portion 15.

When coil yoke 50 and coil 40 are in the stop state in stop position, first leg portion 51 and second leg portion 52 are attracted and held by first support end portion 14a and second support end portion 15a by magnetic attractive force of a magnetic field existing in first support end portion 14a and second support end portion 15a. In coil yoke 50, as illustrated by a void arrow in FIG. 5, magnetic flux is formed to circulate in coil yoke 50, passing from second support end portion 15a through second leg portion 52, bottom portion 53, and first leg portion 51 in sequence and reach first support end portion 14a. This magnetic flux passes through coil yoke 50 to surround coil 40 from outside to inside between second support end portion 15a and first support end portion 14a. Accordingly, coil yoke 50 is attracted by first support end portion 14a and second hold portion 15 by strong magnetic attractive force. As a result, even when external force such as vibration or shock acts on linear actuator 100, coil yoke 50 and coil 40 can be held in the stop positions.

Referring to FIGS. 7 and 8, when coil 40 in the stop state is moved, an electric current is flown into coil 40 in direction D1 along the outer peripheral direction of coil 40. The electric current in direction D1 flows in coil 40 at a portion between first side yoke portion 11 and second side yoke portion 12 in the X axis positive direction from first side yoke portion 11 and second side yoke portion 12 to coil yoke 50, and at a portion outside second side yoke portion 12 in the X axis negative direction from coil yoke 50 to second side yoke portion 12.

By the action of the electric current flowing in direction D1 between first side yoke portion 11 and second side yoke portion 12 and the magnetic flux generated by magnet 30 between first side yoke portion 11 and second side yoke portion 12, Lorentz force acts on coil 40 in the Z axis positive direction as a direction separating from first support end portion 14a and second support end portion 15a. The electric current flowing in coil 40 forms a magnetic field. Accordingly, as indicated by a hatched arrow in FIG. 7, magnetic flux is formed in coil yoke 50 from first leg portion 51 through bottom portion 53 to second leg portion 52. This magnetic flux is repulsive magnetic flux in the direction opposite to the attractive magnetic flux illustrated by the void arrow in FIG. 5. The magnetic flux in coil yoke 50 forms S and N magnetic polarities at ends of first leg portion 51 and second leg portion 52. Accordingly, magnetic repulsive force is generated between first leg portion 51 and first support end portion 14a and between second leg portion 52 and second support end portion 15a. Accordingly, coil 40 is moved in the Z axis positive direction of the axial direction by the magnetic repulsive force and the Lorentz force acting on coil yoke 50. Coil 40 under the two forces is movable even when the value of applied current is low, as compared to the case in which the foregoing repulsive force is not generated. Coil 40 does not consume electric power while being held by first support end portion 14a and second support end portion 15a.

in linear actuator 100, coil yoke 50 may have only first leg portion 51 or second leg portion 52 and main yoke 10 may have only first support end portion 14a or second support end portion 15a to produce the same operations as described above. That is, coil 40 is held in the stop state by the magnetic attractive force, and is moved in the state with a flow of electric current by the Lorentz force and the magnetic repulsive force.

1-3. Advantageous Effects

As described above, linear actuator 100 according to the first exemplary embodiment includes: coil 40 that is movably provided; coil yoke 50 as a magnetic body that is provided to move integrally with coil 40; first side yoke portion 11 as a first yoke that extends outside of coil 40; second side yoke portion 12 as a second yoke that is surrounded by coil 40, extends, and is opposed to first side yoke portion 11; and magnet 30 that forms a magnetic field between first side yoke portion 11 and second side yoke portion 12.

Coil yoke 50 extends along the axis of coil 40. At least one of first side yoke portion 11 and second side yoke portion 12 has first hold portion 14 and/or second hold portion 15 as a support portion, the support portion supporting coil yoke 50 in the stop position and having a magnetic polarity.

In the foregoing configuration, coil yoke 50 in the stop position is supported by first hold portion 14 and second hold portion 15, for example, in a state attracted by first support end portion 14a and second support end portion 15a, by magnetic attractive force of first hold portion 14 and second hold portion 15 having magnetic polarities. Accordingly; even when external force such as vibration or shock acts on linear actuator 100, movement of coil yoke 50 and coil 40 in the stop state in the stop position is suppressed.

When an electric current is flown into coil 40, coil 40 can receive Lorentz force in a direction separating from first hold portion 14 and second hold portion 15 by the action of the electric current and a magnetic field between first side yoke portion 11 and second side yoke portion 12.

In addition, the electric current of coil 40 forms a magnetic field, thereby to form a magnetic field in coil yoke 50. The Lorentz force necessary for the movement of coil 40 and coil yoke 50 can lie reduced by repulsion between the magnetic field of coil yoke 50 and the magnetic field of first hold portion 14 and second hold portion 15, as compared to a case without generation of repulsion. This suppresses power consumption in coil 40.

In linear actuator 100 according to the first exemplary embodiment, coil yoke 50 extends to cross coil 40 from outside of coil 40 to inside of coil 40, and first side yoke portion 11 and second side yoke portion 12 respectively have first hold portion 14 as first support portion and second hold portion 15 as a second support portion. Coil yoke 50 contacts first hold portion 14 and second hold portion 15.

In the foregoing configuration, at the time of application of an electric current to coil 40, a magnetic field is generated in coil yoke 50 inside and outside of coil 40. Accordingly, it is possible to strengthen a magnetic repulsive force between the magnetic field of coil yoke 50 and the magnetic field of first hold portion 14 and second hold portion 15.

In linear actuator 100 according to the first exemplary embodiment, first hold portion 14 and second hold portion 15 have magnetic polarities opposite to each other. Coil yoke 50 is configured to, by contact with first hold portion 14 and second hold portion 15, form magnetic flux passing through coil yoke 50 and crossing coil 40 from outside of coil 40 to inside of coil 40.

In the foregoing configuration, magnetic flux is formed to flow in first hold portion 14, coil yoke 50, and second hold portion 15 in sequence. This strengthens the magnetic attractive force between coil yoke 50 and first hold portion 14, second hold portion 15. In addition, adjusting the electric current to be applied to coil 40 makes it possible to generate a flow of magnetic flux in a direction opposite to the flow of magnetic flux described above in coil yoke 50 and produce effectively magnetic repulsive force between the magnetic field of coil yoke 50 and the magnetic field of first hold portion 14 and second hold portion 15.

In linear actuator 100 according to the first exemplary embodiment, magnet 30 is disposed at least at one of first side yoke portion 11 and second side yoke portion 12 between first side yoke portion 11 and second side yoke portion 12, and first side yoke portion 11 and second side yoke portion 12 are magnetically connected together.

In the foregoing configuration, magnetic flux is formed to flow from first side yoke portion 11 to second side yoke portion 12. This allows the magnetic field of magnet 30 to produce magnetic polarities in first hold portion 14 and second hold portion 15. This simplifies a structure of linear actuator 100.

Second Exemplary Embodiment 2-1. Configuration of a Linear Actuator According to a Second Exemplary Embodiment Linear actuator 200 according to the second exemplary embodiment will be described below with reference to the drawings.

Linear actuator 100 according to the first exemplary embodiment has first hold portion 14 and second hold portion 15 holding coil 40 at one terminal end as seen in the linear movement direction of coil 40. However, linear actuator 200 according to the second exemplary embodiment has a hold portion holding coil 40 at both terminal ends as seen in a linear movement direction of coil 40.

In the following descriptions of the embodiment, constituent elements with identical reference signs to those in FIGS. 1 to 8 are identical or similar constituent elements, and thus detailed descriptions of the identical or similar constituent elements will be omitted. Further, descriptions of the same points as those in the embodiment described above will be omitted.

FIGS. 9 to 14 illustrate linear actuator 200 according to the second exemplary embodiment.

Figure 9:
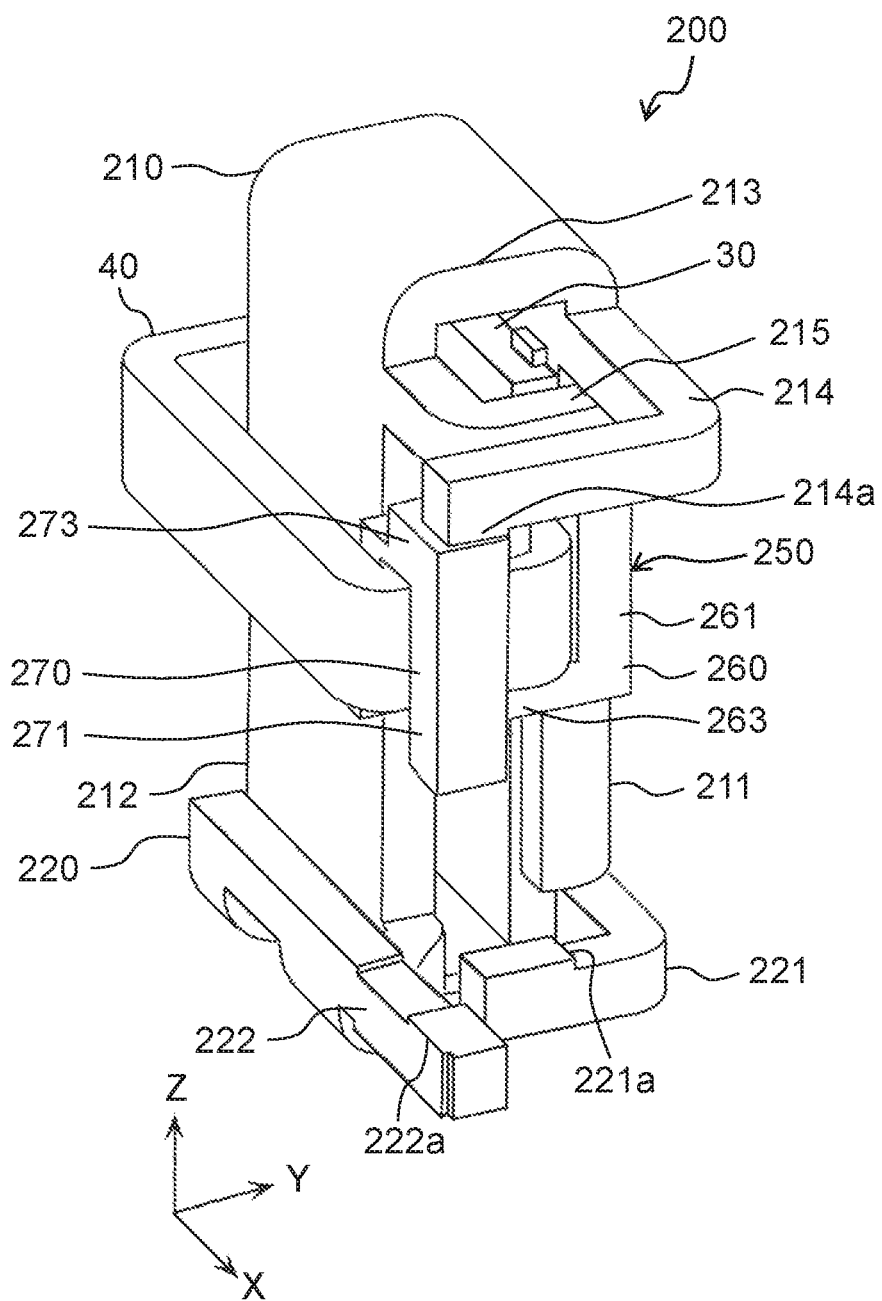
FIG. 9 is a schematic perspective view of a linear actuator according to a second exemplary embodiment, illustrating a state in which a coil as a mover is held in a first stop position.
Figure 10:
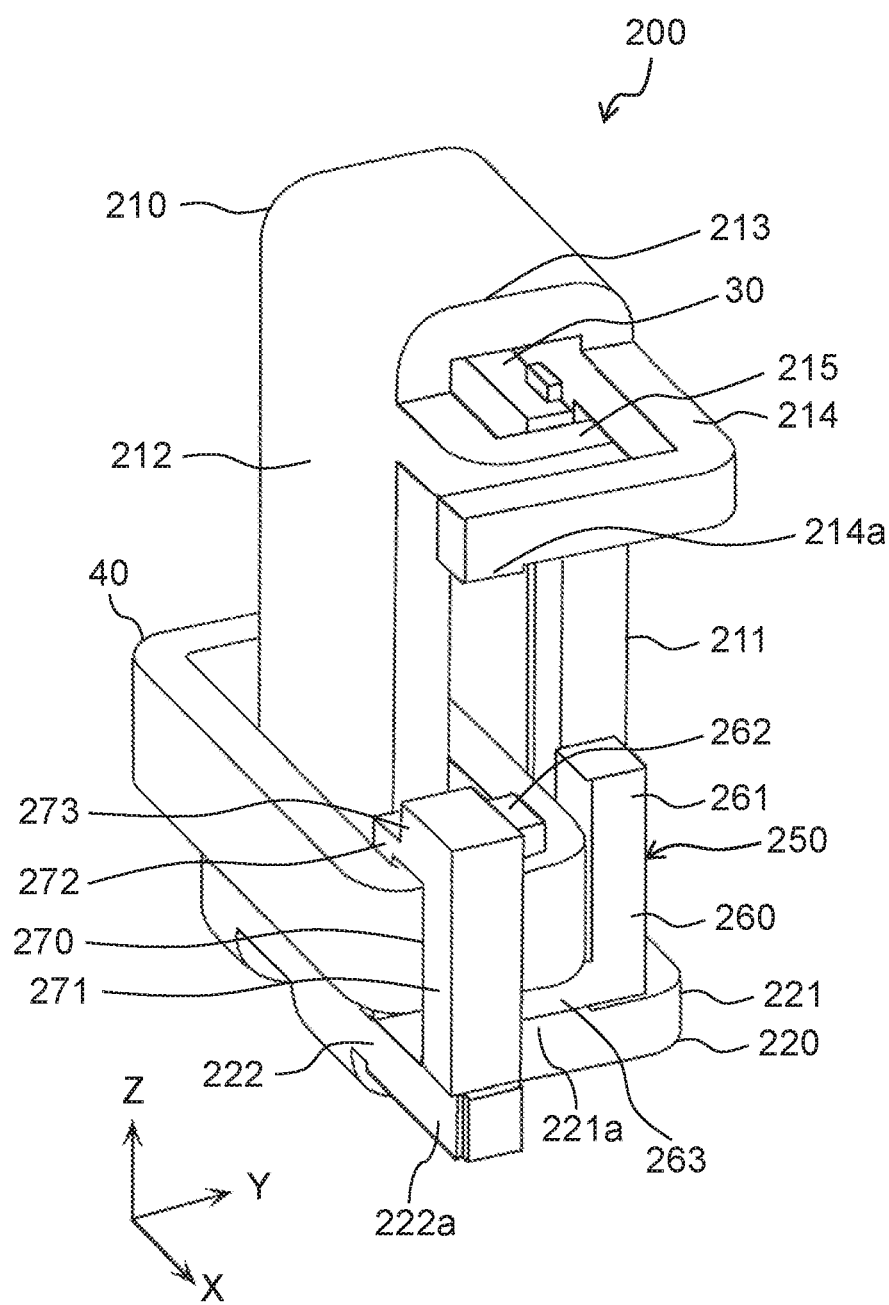
FIG. 10 is a diagram illustrating a state in which, in the linear actuator illustrated in FIG. 9, the coil is held in a second stop position.
Figure 11:
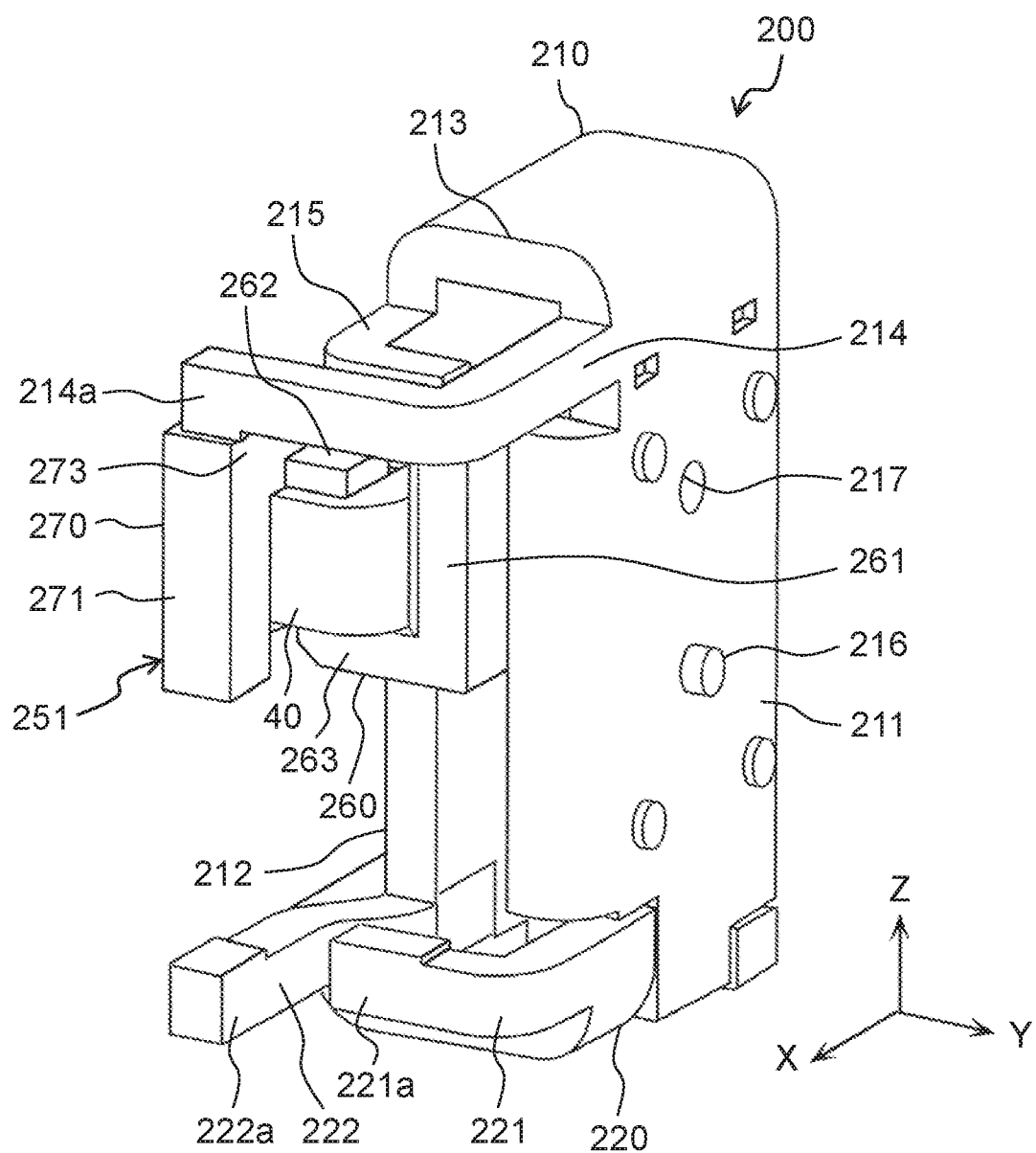
FIG. 11 is a perspective view of the linear actuator illustrated in FIG. 9 as seen from another direction.
Figure 12:
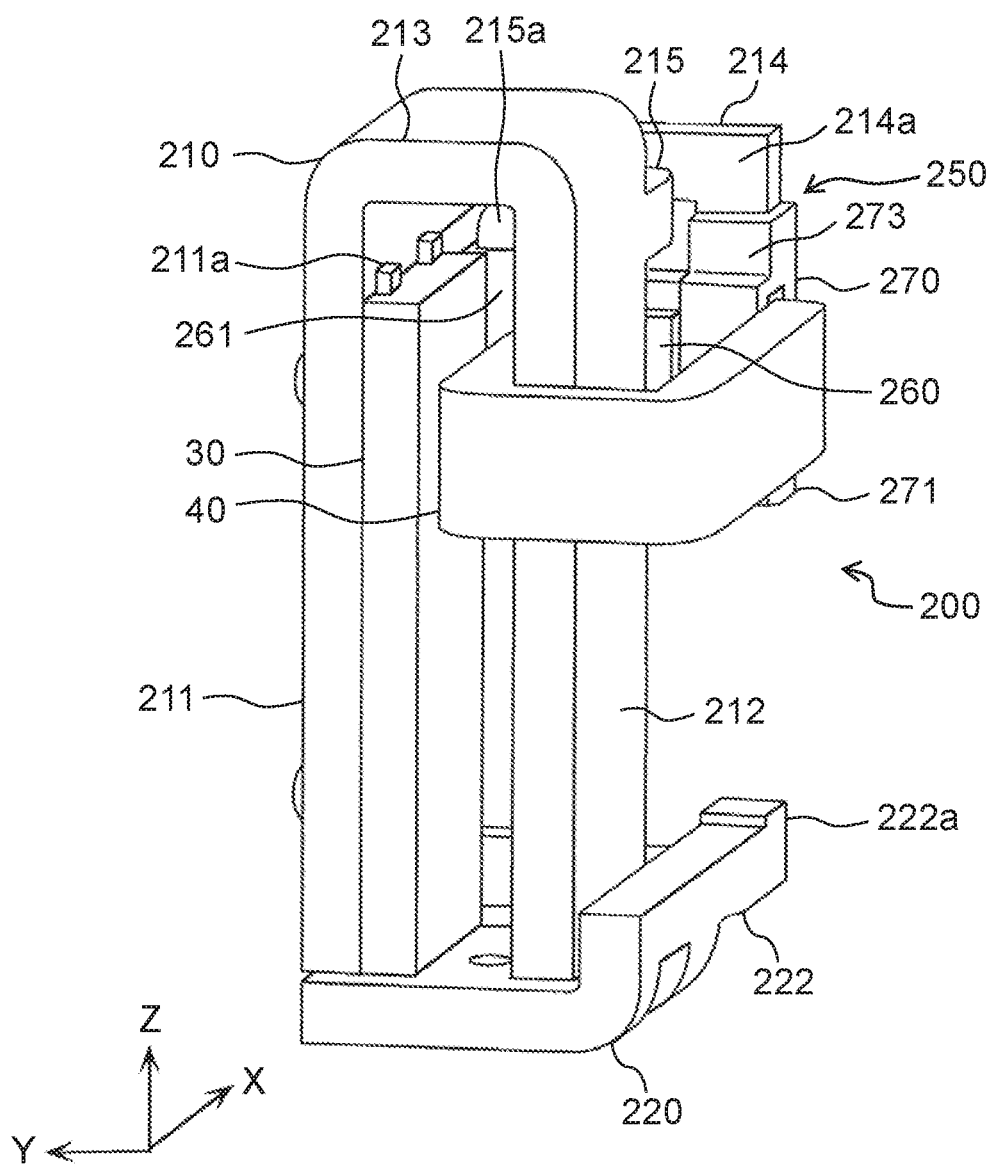
FIG. 12 is a perspective view of the linear actuator illustrated in FIG. 9 as seen from a rear side.
Figure 13:
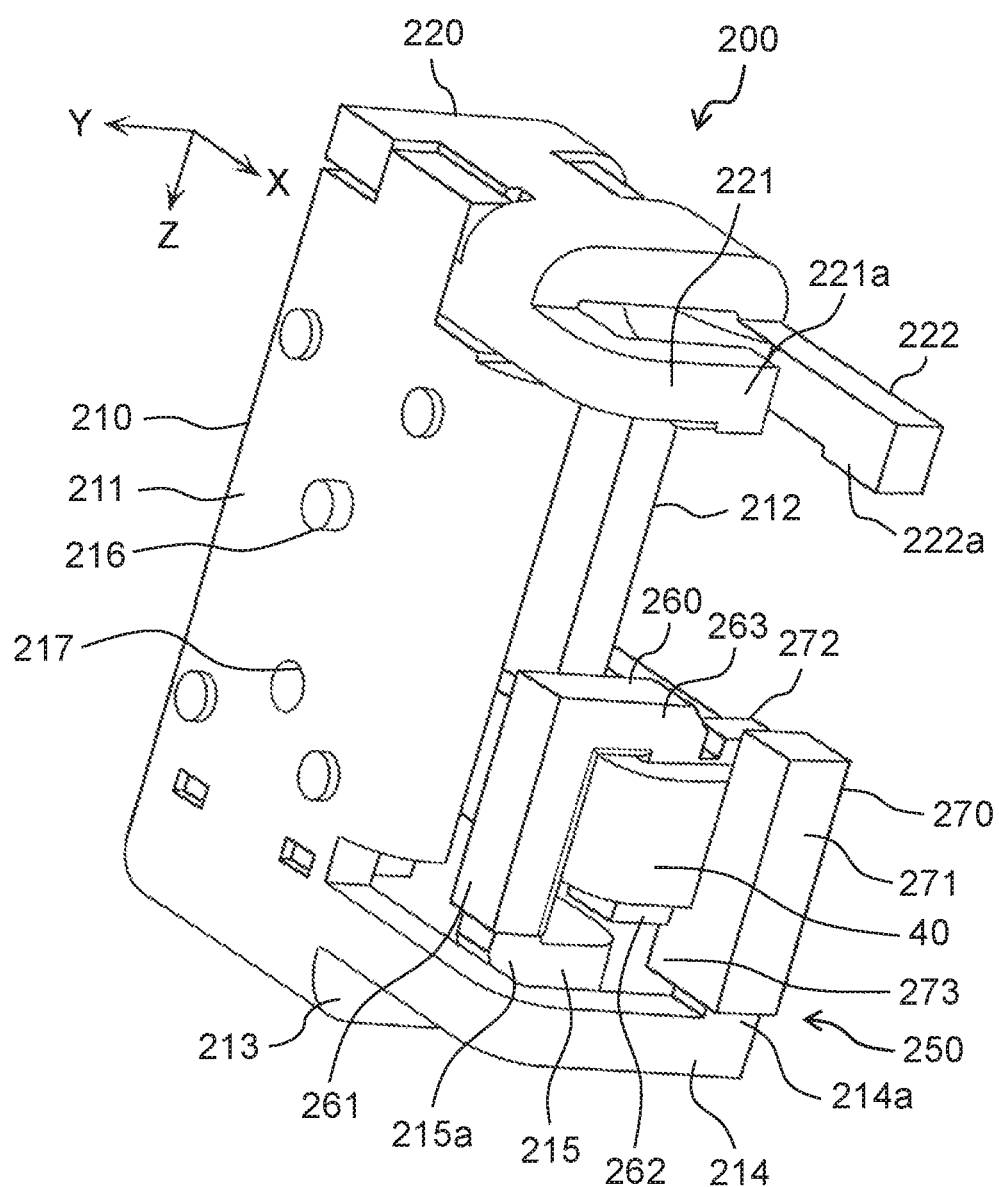
FIG. 13 is a perspective view of the linear actuator illustrated in FIG. 9 upside down.
Figure 14:
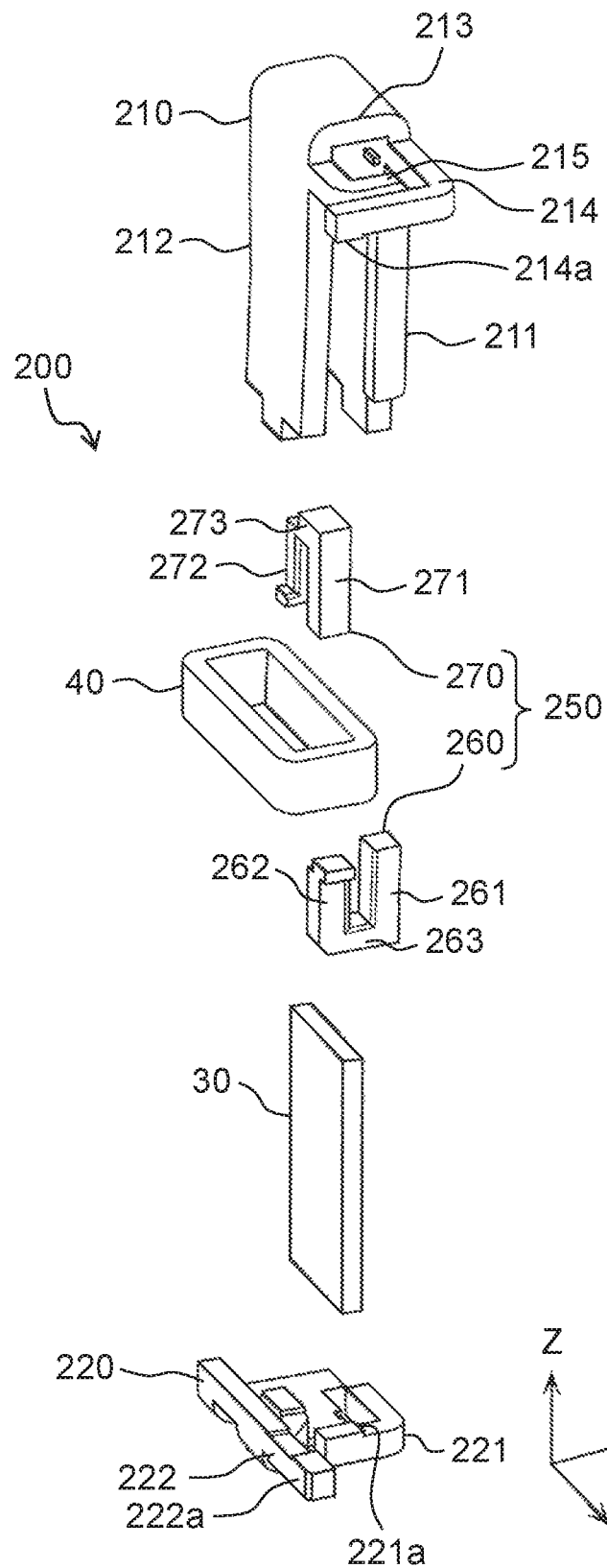
FIG. 14 is an exploded perspective view of the linear actuator illustrated in FIG. 9.

FIG. 9 is a schematic perspective view of an outer appearance of linear actuator 200 according to the second exemplary embodiment, illustrating a state in which coil 40 as a mover is held in a first stop position. FIG. 10 illustrates linear actuator 200 illustrated in FIG. 9 in a state in which coil 40 is held in a second stop position. FIG. 11 is a perspective view of linear actuator 200 illustrated in FIG. 9 as seen from another direction. FIG. 12 is a perspective view of linear actuator 200 illustrated in FIG. 9 as seen from a rear side. FIG. 13 is a perspective view of linear actuator 200 illustrated in FIG. 9 upside down. FIG. 14 is an exploded perspective view of linear actuator 200 illustrated in FIG. 9.

Linear actuator 200 includes coil 40 as a mover and operates coil 40 linearly. Linear actuator 200 includes main yoke 210 and sub yoke 220 coupled to each other, magnet 30 fixedly provided on main yoke 210, coil 40 provided to be movable with respect to main yoke 210, and coil yoke 250 provided integrally with coil 40.

Main yoke 210 as a magnetic body is similar in configuration to main yoke 10 of linear actuator 100 according to the first exemplary embodiment. Main yoke 210 has a U groove shape. Main yoke 210 integrally includes bottom yoke portion 213, and first side yoke portion 211 and second side yoke portion 212 that linearly extend from bottom yoke portion 213 and are opposed to each other.

In the present exemplary embodiment, first side yoke portion 211 and second side yoke portion 212 extend in approximately parallel to each other.

Main yoke 210 integrally includes L-shaped first hold portion 214 and second hold portion 215 respectively integrated with first side yoke portion 211 and second side yoke portion 212. First hold portion 214 and second hold portion 215 are close to each other but are not in contact with each other. First hold portion 214 and second hold portion 215 are disposed with a space between first hold portion 14 and second hold portion 15. There exists a gap between first hold portion 214 and second hold portion 215.

Second hold portion 215 extends to protrude from a base portion of second side yoke portion 212 on the bottom yoke portion 213 side in a direction perpendicular to a direction in which first side yoke portion 211 and second side yoke portion 212 are aligned, and bends and extends to a position opposed to first side yoke portion 211 in a direction from second side yoke portion 212 to first side yoke portion 211.

First hold portion 214 extends to protrude from a base portion of first side yoke portion 211 on the bottom yoke portion 213 side in the same direction as second hold portion 215, and bends and extends to cover second hold portion 215 from outside in a direction from first side yoke portion 211 to second side yoke portion 212, and then reaches a position opposed to second side yoke portion 212.

First hold portion 214 and second hold portion 215 include respectively at front ends first support end portion 214a and second support end portion 215a protruding to a side opposite to bottom yoke portion 213. Accordingly, first hold portion 214 and second hold portion 215 are similar in configuration to first hold portion 14 and second hold portion 15 of linear actuator 100 according to the first exemplary embodiment.

In the present exemplary embodiment, first hold portion 214 and first support end portion 214a, and second hold portion 215 and second support end portion 215a are produced from the same material as that for main yoke 210 to form one continuous member together with main yoke 210. However, these portions may constitute a member separated from main yoke 210 and connected to main yoke 210 as far as magnetic flux flows between these portions and main yoke 210.

In this case, a Z axis is set to a direction in which first side yoke portion 211 and second side yoke portion 212 extend, and a Z axis negative direction is defined as a direction from bottom yoke portion 213 to first side yoke portion 211 and second side yoke portion 212. In addition, a Y axis is set to a direction from first side yoke portion 211 to second side yoke portion 212 and orthogonal to the Z axis, and a direction from second side yoke portion 212 to first side yoke portion 211 is defined as Y axis positive direction. Further, an X direction is set to a direction in which first hold portion 214 and second hold portion 215 protrude from first side yoke portion 211 and second side yoke portion 212 and perpendicular to the Y axis and the Z axis, and the protruding direction is defined as X axis positive direction. Hereinafter, the directions will also be described using the X axis, the Y axis, and the Z axis.

Sub yoke 220 as a magnetic body has a plate shape and couples an end of first side yoke portion 211 and an end of second side yoke portion 212 of main yoke 210. Sub yoke 220 physically and magnetically connects first side yoke portion 211 and second side yoke portion 212. Sub yoke 220 further integrally includes arm-shaped third hold portion 221 and fourth hold portion 222.

Third hold portion 221 and fourth hold portion 222 are close to each other but are not in contact with each other. Third hold portion 221 and fourth hold portion 222 are disposed with a space between third hold portion 221 and fourth hold portion 222. There exists a gap between third hold portion 221 and fourth hold portion 222. Third hold portion 221 and fourth hold portion 222 extend to protrude in the X axis positive direction that is the same direction as the direction in which first hold portion 214 and second hold portion 215 protrude. Third hold portion 221 and fourth hold portion 222 are respective examples of a third support portion and a fourth support portion.

Third hold portion 221 in L shape extends in the X axis positive direction at a position adjacent to first side yoke portion 211, and bends and extends in the Y axis negative direction as a direction from first side yoke portion 211 to second side yoke portion 212. Third hold portion 221 integrally includes at a front end third support end portion 221a protruding toward second hold portion 215.

Fourth hold portion 222 in linear shape extends in the X axis positive direction at a position adjacent to second side yoke portion 212. Fourth hold portion 222 includes at a front end fourth support end portion 222a protruding toward first hold portion 214.

In the present exemplary embodiment, first support end portion 214a and fourth support end portion 222a are opposed to each other in the Z axis direction. Second support end portion 215a and third support end portion 221a are closer to first side yoke portion 211 and second side yoke portion 212 than first support end portion 214a and fourth support end portion 222a and are not opposed to each other but are aligned along the Y axis direction.

In the present exemplary embodiment, third hold portion 221 and third support end portion 221a, and fourth hold portion 222 and fourth support end portion 222a are produced from the same material as that for sub yoke 220 and form one continued member together with sub yoke 220. However, these portions may be separated from sub yoke 220 or may be connected to sub yoke 220 as far as these portions are configured such that magnetic flux flows between these portions and sub yoke 220.

Elongated flat plate-shaped magnet 30 is attached and fixed to a surface of first side yoke portion 211 opposed to second side yoke portion 212 in the Y axis direction as illustrated in FIG. 12 in particular.

Magnet 30 constitutes a stator of linear actuator 200. Magnet 30 is positioned in a longitudinal direction of first side yoke portion 211 by a plurality of positioning projections 211a formed on the surface of first side yoke portion 211. Projections 211a are disposed close to bottom yoke portion 213 to allow arrangement of magnet 30 long in the longitudinal direction. Magnet 30 is opposed to second side yoke portion 212 over almost entire second side yoke portion 212 in the longitudinal direction.

In the present exemplary embodiment, magnet 30 has an N magnetic polarity on a flat surface opposed to second side yoke portion 212, and has an S magnetic polarity on a surface that is positioned on the side opposite to the surface with the N magnetic polarity and is in abutment with first side yoke portion 211.

Figure 15:
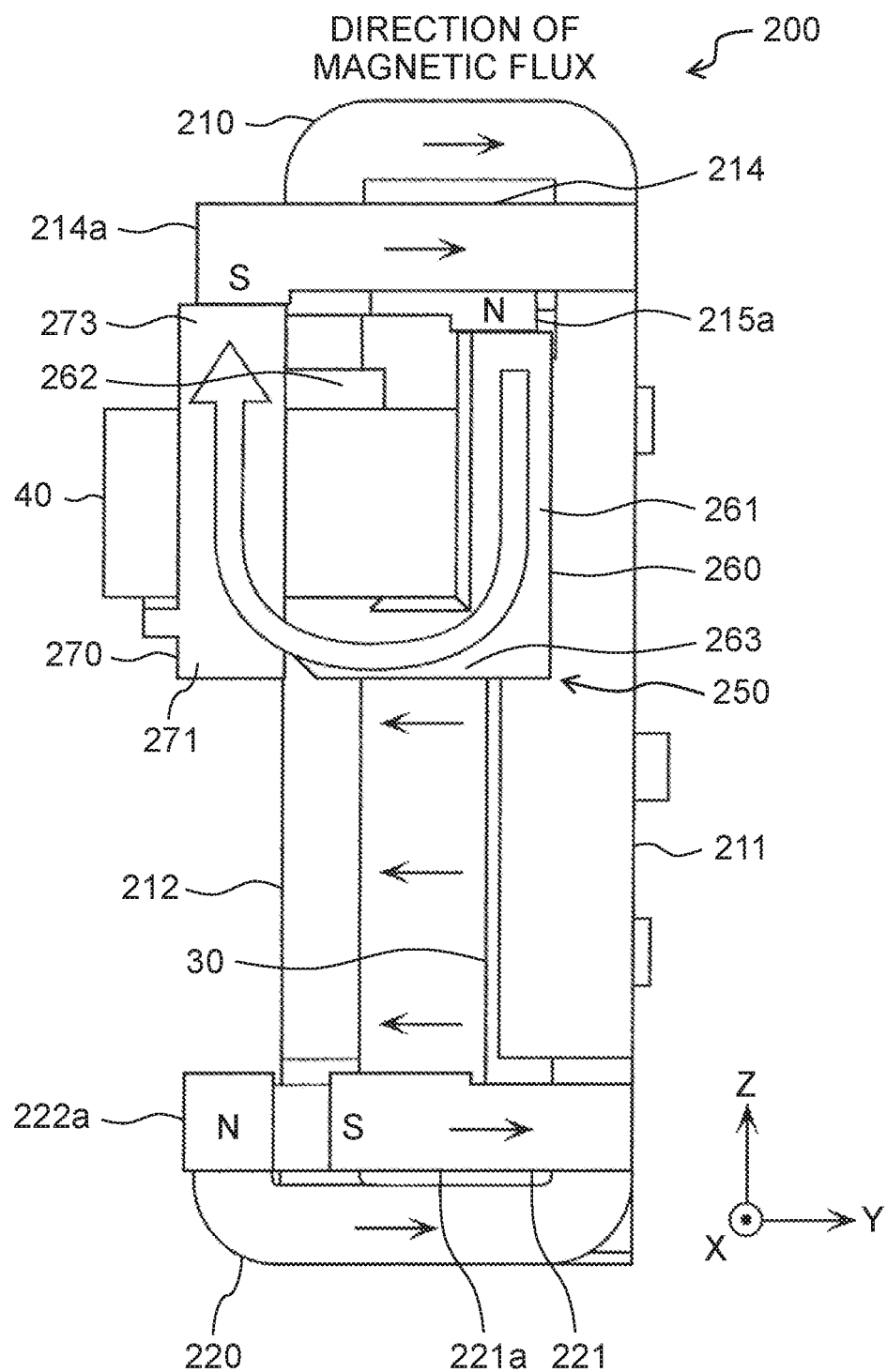
FIG. 15 is a side view of the linear actuator illustrated in FIG. 9, illustrating a state in which the coil is held in a first stop position.
Figure 16:
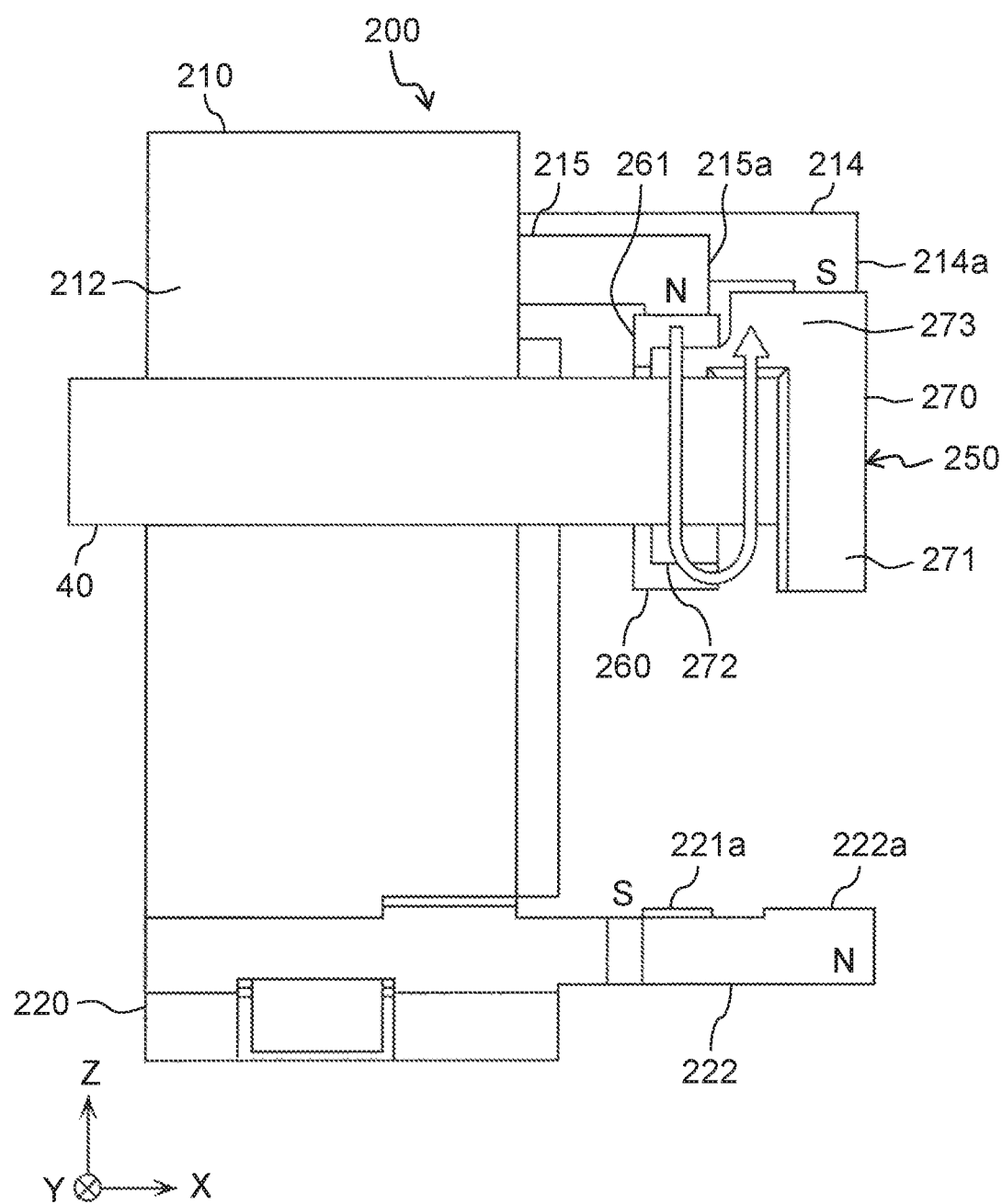
FIG. 16 is a side view of the linear actuator illustrated in FIG. 15 as seen from another direction.

Accordingly, as illustrated in FIGS. 15 and 16, in a gap between first side yoke portion 211 and second side yoke portion 212, magnetic flux is formed in the Y axis negative direction from first side yoke portion 211 to second side yoke portion 212. In addition, in a gap between first hold portion 214 and second hold portion 215 of main yoke 210, magnetic flux is formed from second hold portion 215 to first hold portion 214. Accordingly, first support end portion 214a of first hold portion 214 has an S magnetic polarity, and second support end portion 215a of second hold portion 215 has an N magnetic polarity.

Further, in a gap between third hold portion 221 and fourth hold portion 222 of sub yoke 220, magnetic flux is formed from fourth hold portion 222 to third hold portion 221. Accordingly, third support end portion 221a of third hold portion 221 has an S magnetic polarity and fourth support end portion 222a of fourth hold portion 222 has an N magnetic polarity.

FIG. 15 is a side view of linear actuator 200 illustrated in FIG. 9 as seen from the X axis positive direction to the negative direction, illustrating a state in which coil 40 is held in a first stop position. FIG. 16 is a side view of linear actuator 200 illustrated in FIG. 15 as seen from the Y axis negative direction as a different direction to the positive direction.

Referring to FIGS. 9 to 14, coil 40 is disposed such that second side yoke portion 212 is passed through inside the rectangular cylinder to surround second side yoke portion 212. Coil 40 is disposed with an axial direction approximately parallel to the longitudinal direction of second side yoke portion 212, and is movable in the longitudinal direction with reference to second side yoke portion 212, that is, in the Z axis direction as the longitudinal direction. Coil 40 is disposed such that one of four flat side portions constituting the rectangular cylinder is positioned between first side yoke portion 211 and second side yoke portion 212.

Coil yoke 250 as a magnetic body is attached to coil 40 in such a manner as to move integrally with coil 40. Coil yoke 250 is disposed adjacent to first side yoke portion 211 and second side yoke portion 212 on the X axis positive direction side. Coil yoke 250 is configured such that two reversed U-shaped members are coupled together in a crossing orientation.

Specifically, coil yoke 250 integrally includes first U-shaped portion 260 having a U flat plate shape and second U-shaped portion 270 having a U flat plate shape. First U-shaped portion 260 integrally includes bottom portion 263 constituting a U-shaped bottom portion and first leg portion 261 and second leg portion 262 constituting U-shaped opposed side portions. Second U-shaped portion 270 integrally includes bottom portion 273 constituting a U-shaped bottom portion and first leg portion 271 and second leg portion 272 constituting U-shaped opposed side portions. In this case, first U-shaped portion 260 and second U-shaped portion 270 are respective examples of first magnetic portion and second magnetic portion.

First U-shaped portion 260 is disposed with bottom portion 263 positioned in the Z axis negative direction, and second U-shaped portion 270 is disposed with bottom portion 273 positioned in the Z axis positive direction. Second leg portion 262 of first U-shaped portion 260 and second leg portion 272 of second U-shaped portion 270 are combined and disposed inside coil 40.

In the present exemplary embodiment, first leg portion 261 of first U-shaped portion 260 and first leg portion 271 of second U-shaped portion 270 are positioned perpendicular to each other with respect to a joint portion between second leg portion 262 and second leg portion 272. Specifically, first leg portion 261 is positioned in the Y axis positive direction and first leg portion 271 is positioned in the X axis positive direction with respect to the joint portion. Accordingly, first U-shaped portion 260 and second U-shaped portion 270 are joined together to cross vertically in a direction along an XY plane.

The crossing angle of first U-shaped portion 260 and second U-shaped portion 270 is not limited to 90°. As described later, both first U-shaped portion 260 and second U-shaped portion 270 are disposed to cross coil 40 from inside of coil 40 to outside of coil 40.

First U-shaped portion 260 extends in a direction along a YZ plane and is disposed to cross from inside to outside a side portion on the Y axis positive direction side out of four side portions forming the rectangular cylinder of coil 40 at an end on the Z axis negative direction side. Bottom portion 263 of first U-shaped portion 260 is adjacent to an end of coil 40 on the Z axis negative direction side and extends crossing coil 40 in the Y axis direction. Second leg portion 262 of first U-shaped portion 260 linearly extends along the axis of coil 40, passing from bottom portion 263 through inside of coil 40 at a position opposed to second side yoke portion 212. First leg portion 261 of first U-shaped portion 260 linearly extends in the axis direction of coil 40 and in approximately parallel to second leg portion 262, passing from bottom portion 263 through outside of coil 40 on the Y axis positive direction side at a position opposed to first side yoke portion 211.

Second U-shaped portion 270 extends in a direction along an XZ plane and is disposed to cross from inside to outside a side portion on the X axis positive direction side out of four side portions forming the rectangular cylinder of coil 40 at an end on the Z axis positive direction side. Bottom portion 273 of second U-shaped portion 270 is adjacent to an end of coil 40 on the Z axis positive direction side and extends crossing coil 40 in the X axis direction. Second leg portion 272 of second U-shaped portion 270 linearly extends along the axis of coil 40, passing from bottom portion 273 through inside of coil 40 at a position opposed to second side yoke portion 212. First leg portion 271 of second U-shaped portion 270 linearly extends in the axis direction of coil 40 and in approximately parallel to second leg portion 272, passing from bottom portion 273 through outside of coil 40 on the X axis positive direction side.

Second leg portion 272 of second U-shaped portion 270 and second leg portion 262 of first U-shaped portion 260 are adjacent to each other inside coil 40 in the Y axis direction and are integrated with each other. Accordingly, first U-shaped portion 260 and second U-shaped portion 270 are joined together such that an alignment direction of first leg portion 261 and second leg portion 262 and an alignment direction of first leg portion 271 and second leg portion 272 are approximately perpendicular to each other.

When coil yoke 250 moves together with coil 40 toward first hold portion 214 and second hold portion 215 in a direction along second side yoke portion 212 as the axial direction of coil 40, an end of first leg portion 261 of first U-shaped portion 260 of coil yoke 250 on the Z axis positive direction side abuts with second support end portion 215a of second hold portion 215. Further, bottom portion 273 of second U-shaped portion 270 of coil yoke 250 abuts with first support end portion 214a of first hold portion 214. First leg portion 261 and bottom portion 273 are configured to abut with second support end portion 215a and first support end portion 214a at the same time. Coil yoke 250 does not contact first hold portion 214 and second hold portion 215 except for first support end portion 214a and second support end portion 215a protruding in the Z axis negative direction. Coil yoke 250 does not contact first hold portion 214 and second hold portion 215 except for first support end portion 214a and second support end portion 215a protruding in the Z axis positive direction.

When coil yoke 250 moves together with coil 40 toward third hold portion 221 and fourth hold portion 222 along second side yoke portion 212, bottom portion 263 of first U-shaped portion 260 of coil yoke 250 abuts with third support end portion 221a of third hold portion 221. The end of first leg portion 271 of second U-shaped portion 270 of coil yoke 250 on Z axis negative direction side abuts with fourth support end portion 222a of fourth hold portion 222. Bottom portion 263 and first leg portion 271 are configured to abut with third support end portion 221a and fourth support end portion 222a at the same time. Coil yoke 250 does not contact third hold portion 221 and fourth hold portion 222 except for third support end portion 221a and fourth support end portion 222a protruding in the Z axis positive direction.

2-2. Operations of the Linear Actuator According to the Second Exemplary Embodiment Operations of linear actuator 200 according to the second exemplary embodiment will be described with reference to FIGS. 15 to 22.

Figure 17:
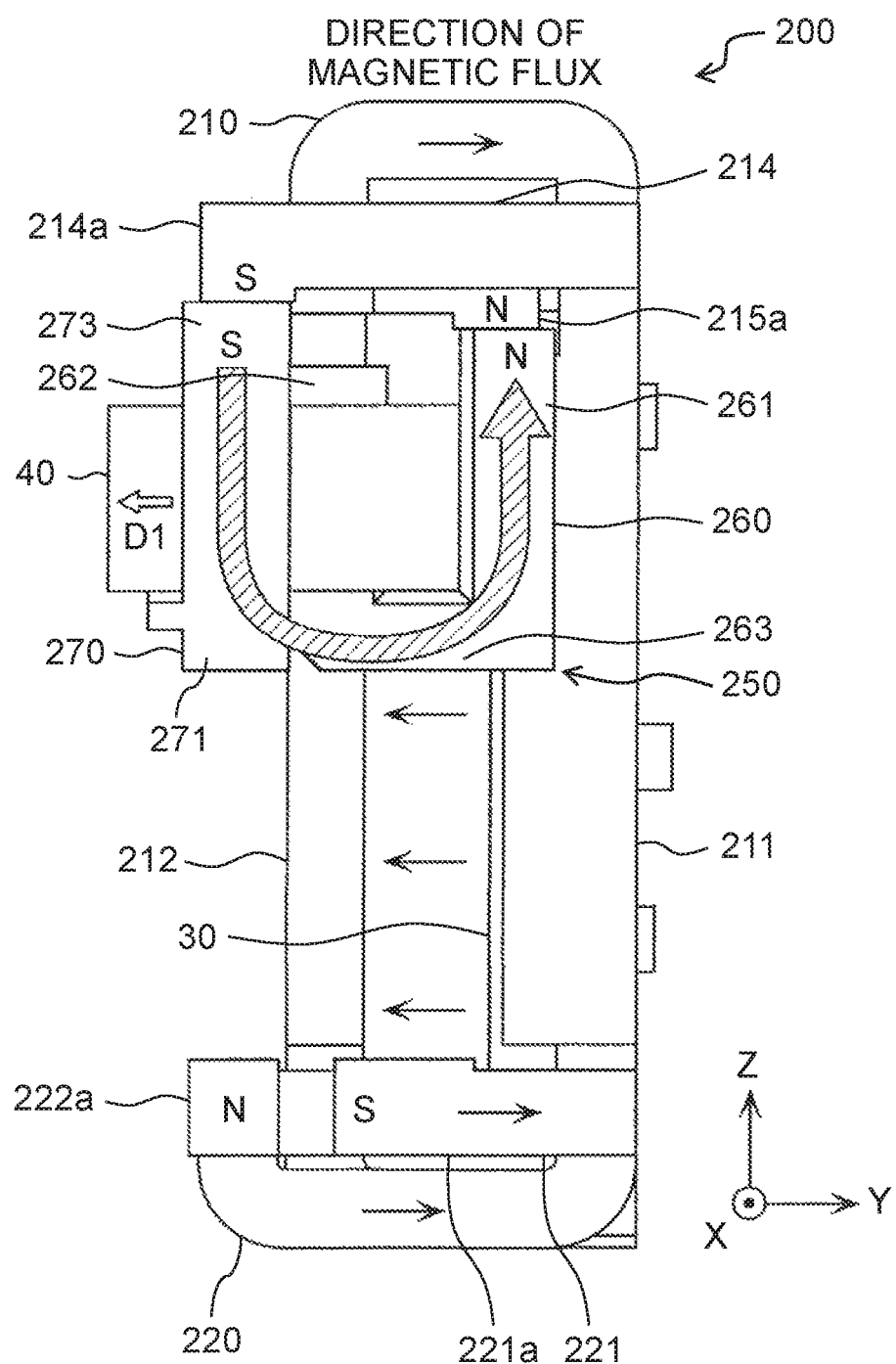
FIG. 17 is a side view of the linear actuator illustrated in FIG. 15, illustrating a state in which an electric current is flown into the coil.
Figure 18:
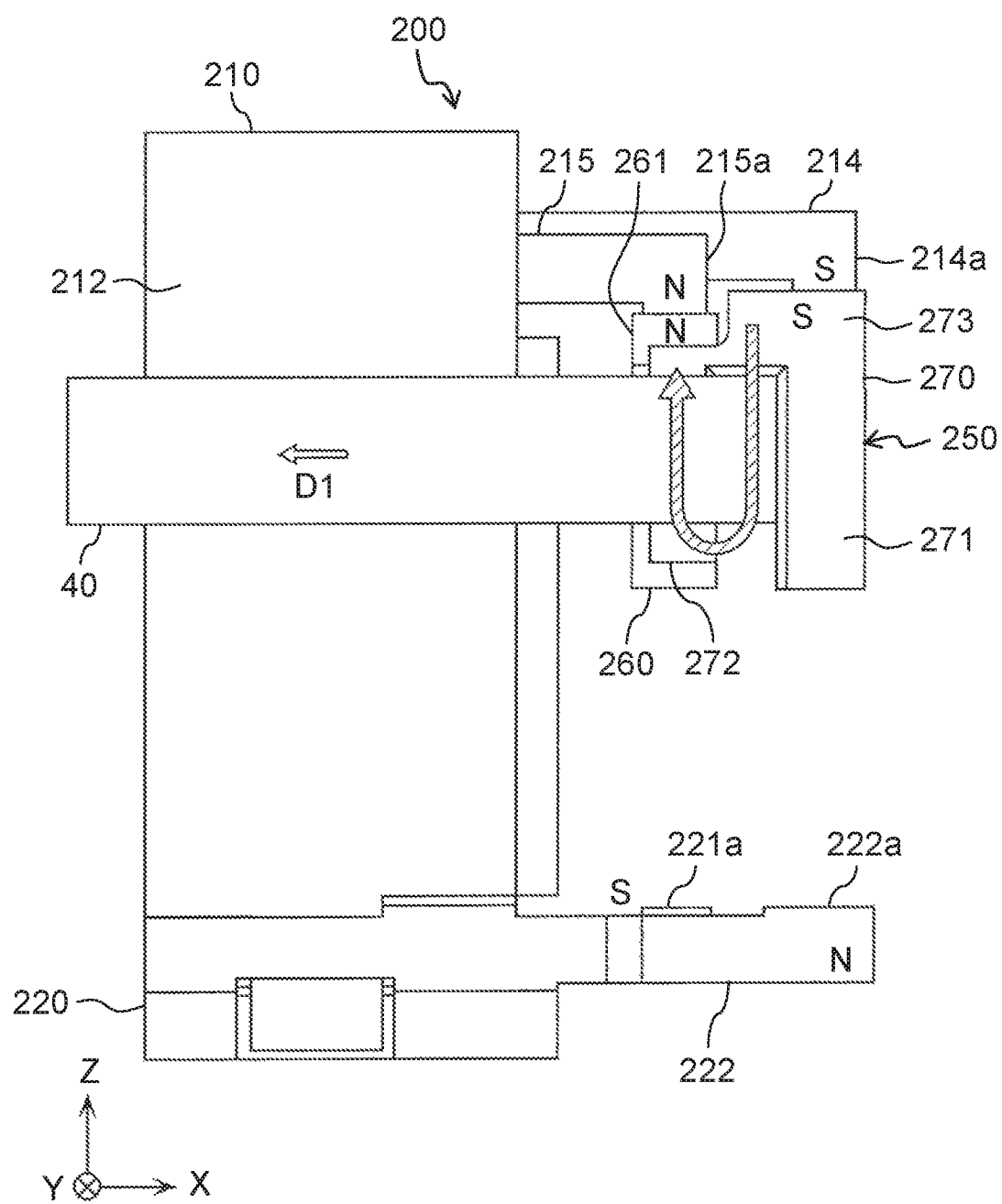
FIG. 18 is a side view of the linear actuator illustrated in FIG. 17 from the same direction as that in FIG. 16.
Figure 19:
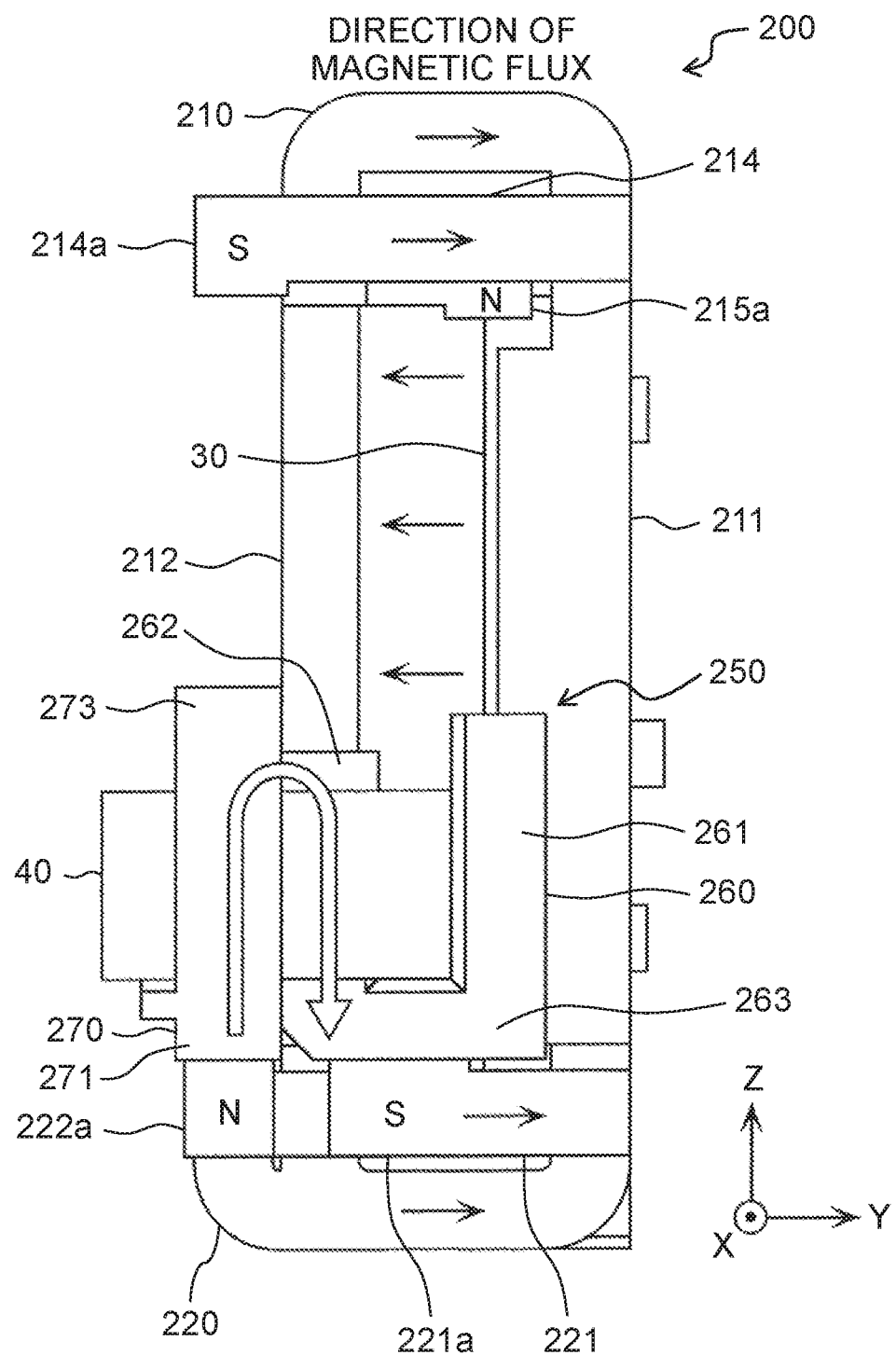
FIG. 19 is a side view of the linear actuator illustrated in FIG. 15, illustrating a state in which the coil is held in a second stop position.
Figure 20:
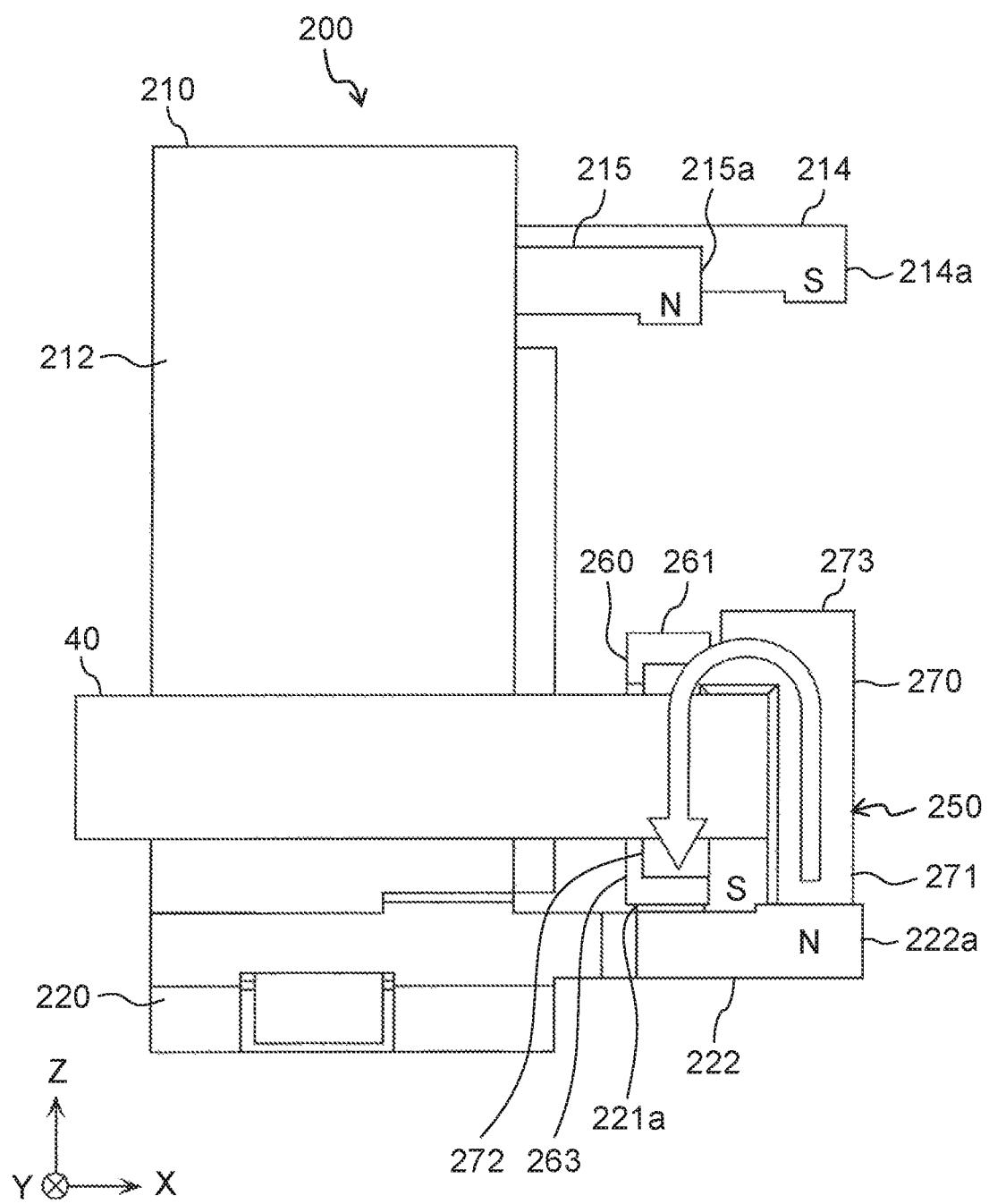
FIG. 20 is a side view of the linear actuator illustrated in FIG. 19 from the same direction as that in FIG. 16.
Figure 21:
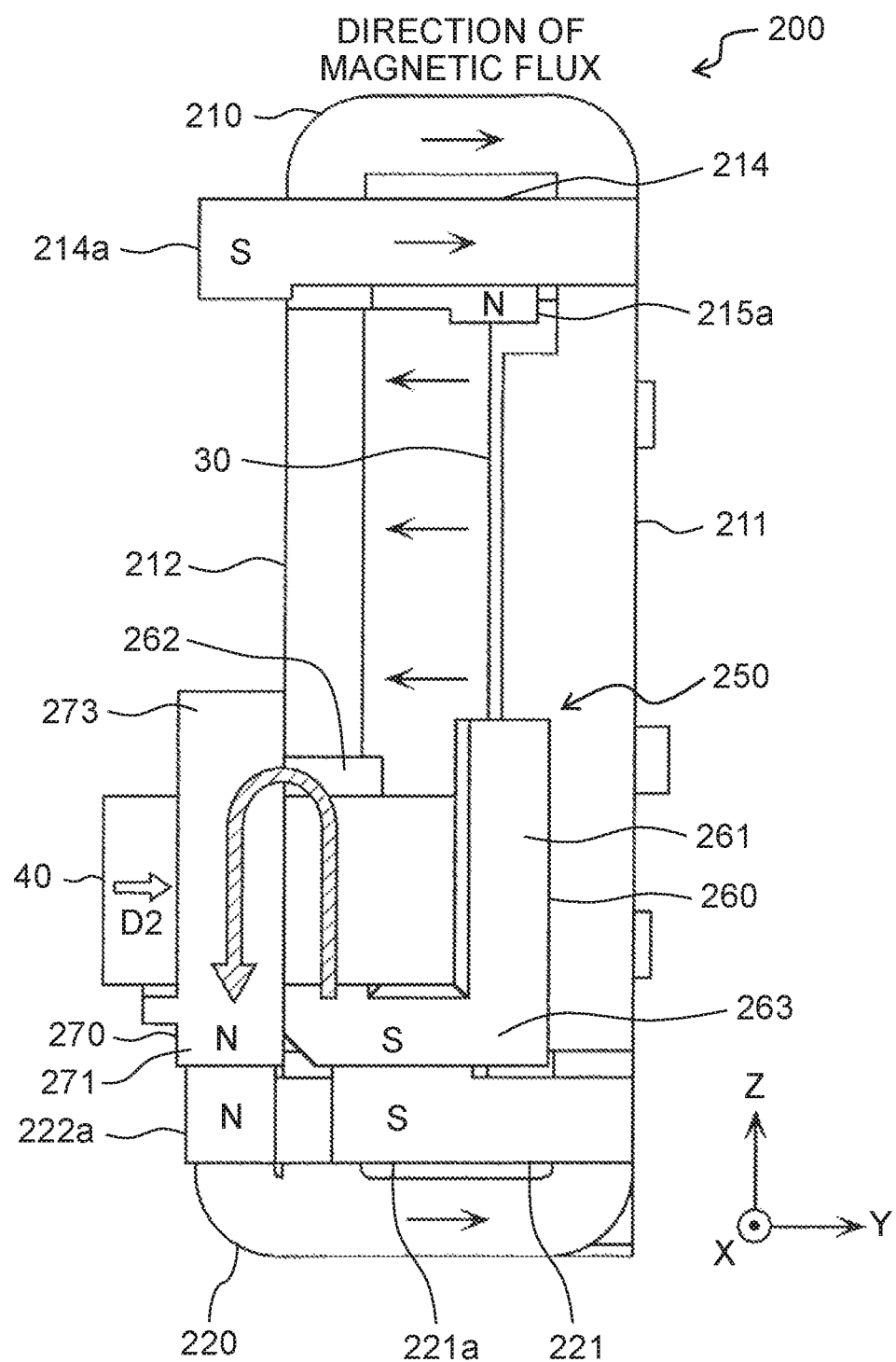
FIG. 21 is a side view of the linear actuator illustrated in FIG. 19, illustrating a state in which an electric current is flown into the coil.
Figure 22:
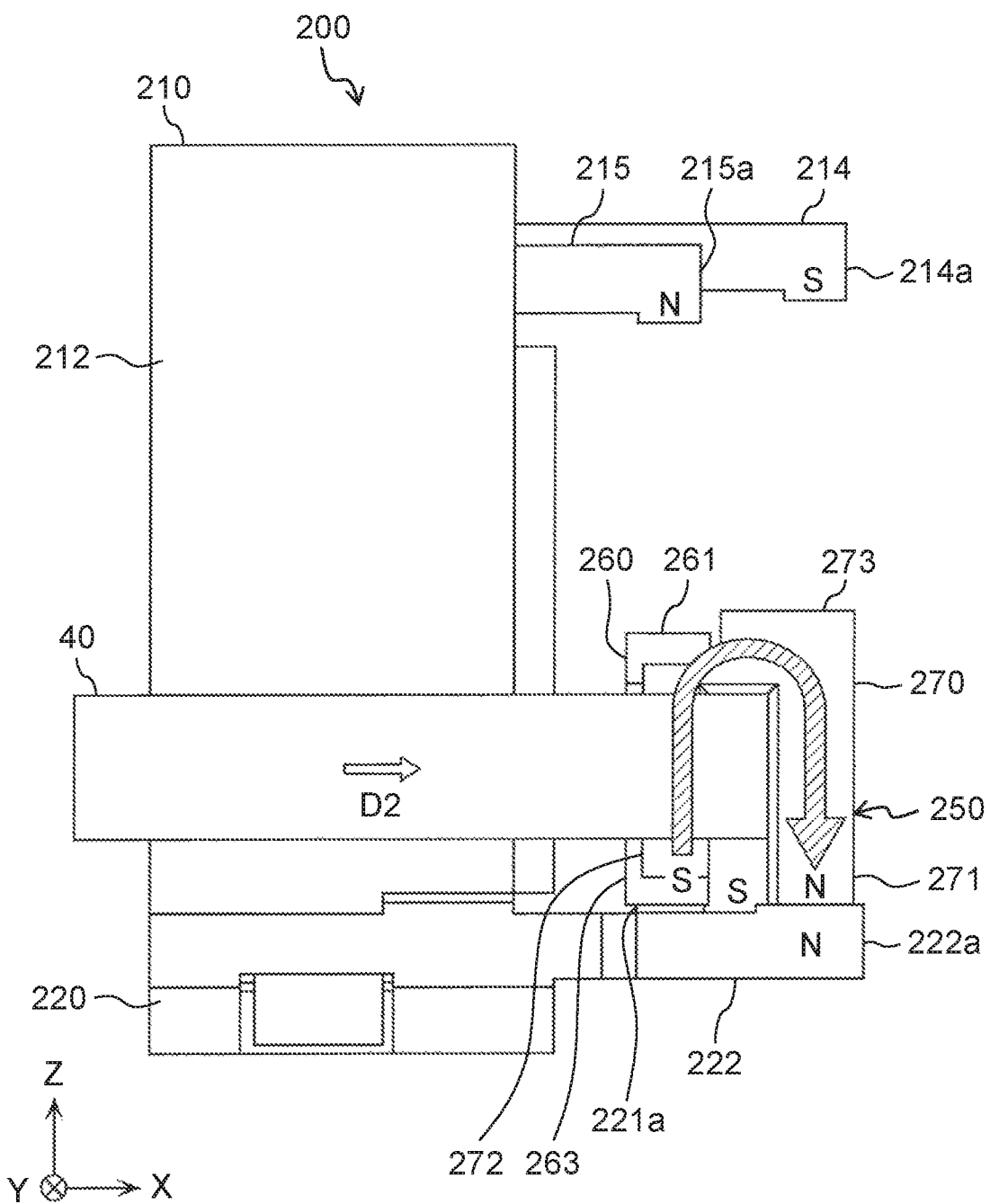
FIG. 22 is a side view of the linear actuator illustrated in FIG. 21 from the same direction as that in FIG. 16.

FIG. 17 is a side view of linear actuator 200 illustrated in FIG. 15, illustrating a state in which an electric current is flown into coil 40. FIG. 18 is a side view of linear actuator 200 illustrated in FIG. 17 as seen from the same direction as that illustrated in FIG. 16. FIG. 19 is a side view of linear actuator 200 illustrated in FIG. 15, illustrating a state in which coil 40 is held in a second stop position. FIG. 20 is a side view of linear actuator 200 illustrated in FIG. 19 as seen from the same direction as that illustrated in FIG. 16. FIG. 21 is a side view of linear actuator 200 illustrated in FIG. 19, illustrating a state in which an electric current is flown into coil 40. FIG. 22 is a side view of linear actuator 200 illustrated in FIG. 21 as seen from the same direction as that illustrated in FIG. 16.

Referring to FIGS. 15 and 16, in linear actuator 200, coil 40 is stopped in a state in which first leg portion 261 of first U-shaped portion 260 and bottom portion 273 of second U-shaped portion 270 of coil yoke 250 abut with second support end portion 215a of second hold portion 215 and first support end portion 214a of first hold portion 214 at the same time. The positions of coil yoke 250 and coil 40 in such an abutment and stop state are a first stop position out of two stop positions of coil yoke 250 and coil 40 set in linear actuator 200. In the first stop position, bottom portion 273 and first leg portion 261 are attracted and held by first support end portion 214a and second support end portion 215a by magnetic attractive force of a magnetic field existing in first support end portion 214a and second support end portion 215a. Accordingly, coil yoke 250 and coil 40 are supported and held in the first stop position by first support end portion 214a and second support end portion 215a.

In coil yoke 250 in the stop state in the first stop position, a flow of magnetic flux is formed as indicated by void arrows in FIGS. 15 and 16. This magnetic flux circulates in coil yoke 250 to pass from second support end portion 215a through first leg portion 261, bottom portion 263, and second leg portion 262 of first U-shaped portion 260, and second leg portion 272 and bottom portion 273 of second U-shaped portion 270 in sequence, and reach first support end portion 214a. This magnetic flux passes through coil yoke 250 to surround coil 40 from outside to inside between second support end portion 215a and first support end portion 214a. Accordingly, coil yoke 250 is attracted and held by first support end portion 214a and second support end portion 215a by strong magnetic attractive force. As a result, even when external force such as vibration or shock acts on linear actuator 200, coil 40 and coil yoke 250 can be held in the first stop positions.

Referring to FIGS. 17 and 18, when coil 40 in the stop state in the first stop position is moved, an electric current is flown into coil 40 in direction D1. The electric current in direction D1 flows in coil 40 at a portion between first side yoke portion 211 and second side yoke portion 212 in the X axis positive direction from first side yoke portion 211 and second side yoke portion 212 to coil yoke 250, and at a portion outside second side yoke portion 212 in the X axis negative direction from coil yoke 250 to second side yoke portion 212.

By the action of the electric current flowing in direction D1 between first side yoke portion 211 and second side yoke portion 212 and the magnetic flux generated by magnet 30 between first side yoke portion 211 and second side yoke portion 212, Lorentz force acts on coil 40 in the Z axis negative direction as a direction separating from first support end portion 214a and second support end portion 215a. The electric current flowing in coil 40 forms a magnetic field. Accordingly, magnetic flux is formed in coil yoke 250 as indicated by hatched arrows in FIGS. 17 and 18. This magnetic flux passes from bottom portion 273 of second U-shaped portion 270 and second leg portion 262 of first U-shaped portion 260 through bottom portion 263 to first leg portion 261 of first U-shaped portion 260, which is repulsive magnetic flux opposite in direction to the attractive magnetic flux indicated by the void arrows in FIGS. 15 and 16. The magnetic flux in coil yoke 250 forms S and N magnetic polarities at ends of bottom portion 273 and first leg portion 261.

Accordingly, magnetic repulsive force is generated between bottom portion 273 and first support end portion 214a and between first leg portion 261 and second support end portion 215a. Accordingly, coil 40 is moved in the Z axis negative direction of the axial direction by the magnetic repulsive force and the Lorentz force acting on coil yoke 250. Coil 40 under the two forces is movable even when the value of applied current is low, as compared to the case in which the foregoing repulsive force is not generated. Coil 40 does not consume electric power while being held by first support end portion 214a and second support end portion 215a.

When coil yoke 250 moving together with coil 40 in the Z axis negative direction abuts with third support end portion 221a of third hold portion 221 and fourth support end portion 222a of fourth hold portion 222, coil 40 is stopped and the application of the electric current to coil 40 is halted.

At this time, as illustrated in FIGS. 19 and 20, coil 40 is stopped such that ends of bottom portion 263 of first U-shaped portion 260 and first leg portion 271 of second U-shaped portion 270 of coil yoke 250 are in abutment with third support end portion 221a and fourth support end portion 222a at the same time. The positions of coil yoke 250 and coil 40 in such an abutment and stop state are a second stop position out of two stop positions of coil yoke 250 and coil 40 set in linear actuator 200. In the second stop position, bottom portion 263 and first leg portion 271 are attracted and held by third support end portion 221a and fourth support end portion 222a by magnetic attractive force of magnetic fields existing in third support end portion 221a and fourth support end portion 222a.

Accordingly, coil yoke 250 and coil 40 are supported and held in the second stop position by third support end portion 221a and fourth support end portion 222a.

In coil yoke 250 in the stop state in the second stop position, a flow of magnetic flux is formed as indicated by void arrows in FIGS. 19 and 20. This magnetic flux circulates in coil yoke 250 to pass from fourth support end portion 222a through first leg portion 271, bottom portion 273, and second leg portion 272 of second U-shaped portion 270, and second leg portion 262 and bottom portion 263 of first U-shaped portion 260 in sequence, and reach third support end portion 221a. This magnetic flux passes through coil yoke 250 to surround coil 40 from outside to inside between fourth support end portion 222a and third support end portion 221a.

Accordingly, coil yoke 250 is attracted and held by third support end portion 221a and fourth support end portion 222a by strong magnetic attractive force. As a result, even when external force such as vibration or shock acts on linear actuator 200, coil 40 and coil yoke 250 can be held in the second stop positions.

Referring to FIGS. 21 and 22, when coil 40 in the stop state in the second stop position is moved, an electric current is flown into coil 40 in direction 172. The direction D2 is opposite to direction D1 in coil 40.

By the action of the electric current flowing in direction D2 between first side yoke portion 211 and second side yoke portion 212 and the magnetic flux generated by magnet 30 between first side yoke portion 211 and second side yoke portion 212, Lorentz force acts on coil 40 in the Z axis positive direction as a direction separating from third support end portion 221a and fourth support end portion 222a.

The electric current flowing in coil 40 forms a magnetic field. Accordingly, magnetic flux is formed in coil yoke 250 as indicated by hatched arrows in FIGS. 21 and 22. This magnetic flux passes from bottom portion 263 of first U-shaped portion 260 through second leg portion 262, and second leg portion 272 and bottom portion 273 of second U-shaped portion 270 to first leg portion 271, which is repulsive magnetic flux opposite in direction to the attractive magnetic flux indicated by the void arrows in FIGS. 19 and 20. The magnetic flux in coil yoke 250 forms S and N magnetic polarities at ends of bottom portion 263 and first leg portion 271.

Accordingly, magnetic repulsive force is generated between bottom portion 263 and third support end portion 221a and between first leg portion 271 and fourth support end portion 222a. Accordingly, coil 40 is moved in the Z axis positive direction of the axial direction by the magnetic repulsive force and the Lorentz force acting on coil yoke 250. Coil 40 under the two forces is movable even when the value of applied current is low, as compared to the case in which the foregoing repulsive force is not generated. Coil 40 does not consume electric power while being held by third support end portion 221a fourth support end portion 222a.

In linear actuator 200, coil yoke 250 may have only first U-shaped portion 260 or second U-shaped portion 270 and main yoke 210 may have only second support end portion 215a and third support end portion 221a or only first support end portion 214a and fourth support end portion 222a to produce the same operations as described above. That is, coil 40 is held in the stop state in the first stop position and the second stop position by the magnetic attractive force, and is moved in the state with a flow of electric current by the Lorentz force and the magnetic repulsive force. When coil yoke 250 has only first U-shaped portion 260, first U-shaped portion 260 may have at least first leg portion 261 and bottom portion 263. When coil yoke 250 has only second U-shaped portion 270, second U-shaped portion 270 may have at least first leg portion 271 and bottom portion 273.

2-3. Advantageous Effects

According to linear actuator 200 in the second exemplary embodiment described above, it is possible to obtain the same advantageous effects as those of linear actuator 100 in the first exemplary embodiment.

In linear actuator 200 according to the second exemplary embodiment, each of first side yoke portion 211 and second side yoke portion 212 has third hold portion 221 as third support portion and fourth hold portion 222 as fourth support portion at positions on the side opposite to first hold portion 214 and second hold portion 215 as seen in the movement direction of coil 40. Coil yoke 250 contacts first hold portion 214 and second hold portion 215 in the first stop position as one of the stop positions as seen in the movement direction of the coil 40 and contacts third hold portion 221 and fourth hold portion 222 in the second stop position as the other stop position as seen in the movement direction of coil 40.

According to the foregoing configuration, coil 40 and coil yoke 250 can be held by the magnetic attractive force in the first stop position and the second stop position. Accordingly, linear actuator 200 can hold coil 40 in the two stop positions.

In linear actuator 200 according to the second exemplary embodiment, third hold portion 221 and fourth hold portion 222 have magnetic polarities opposite to each other. Coil yoke 250 is configured to form magnetic flux passing through coil yoke 250 and crossing coil 40 from outside of coil 40 to inside of coil 40 by contact with third hold portion 221 and fourth hold portion 222.

According to the foregoing configuration, even with coil 40 in the second stop position, it is possible to form magnetic flux flowing in third hold portion 221, coil yoke 250, and fourth hold portion 222 in sequence. This generates strong magnetic attractive force between coil yoke 250 and third hold portion 221, fourth hold portion 222. In addition, adjusting the electric current to be applied to coil 40 makes it possible to generate a flow of magnetic flux in a direction opposite to the flow of magnetic flux described above in coil yoke 250 and produce effectively magnetic repulsive force between the magnetic field of coil yoke 250 and the magnetic field of third hold portion 221 and fourth hold portion 222.

In linear actuator 200 according to the second exemplary embodiment, first side yoke portion 211 and second side yoke portion 212 are connected to each other. In addition, first side yoke portion 211 and second side yoke portion 212 are formed by main yoke 210 that has first hold portion 214 and second hold portion 215 and has magnet 30 disposed, and sub yoke 220 that has third hold portion 221 and fourth hold portion 222. The main yoke 210 and sub yoke 220 form members separate from each other and are connected to each other.

According to the foregoing configuration, main yoke 210 and sub yoke 220 are separated from each other before assembly of linear actuator 200, and thus coil 40 can be easily installed in main yoke 210. In addition, connecting and assembling main yoke 210 and sub yoke 220 allows the individual hold portions to be disposed in predetermined positions. This facilitates manufacture of linear actuator 200. Modifying the configuration of sub yoke 220 makes it possible to change linear actuator 200 to linear actuator 100 according to the first exemplary embodiment.

In linear actuator 200 according to the second exemplary embodiment, coil yoke 250 includes first U-shaped portion 260 as a first magnetic portion that crosses coil 40 from outside to inside of coil 40 at one end as seen along the axis of coil 40 and second U-shaped portion 270 as a second magnetic portion that crosses coil 40 from outside to inside of coil 40 at the other end as seen along the axis of coil 40. For example, first U-shaped portion 260 and second U-shaped portion 270 may have a U shape, and first U-shaped portion 260 and second U-shaped portion 270 may be connected together to form mutually reverse U shapes.

In the foregoing configuration, coil yoke 250 can be configured to, when coil 40 is in the first stop position, include a portion crossing coil 40 between first hold portion 214 and second hold portion 215 on a side opposite to these portions. Further, coil yoke 250 can be configured to, when coil 40 is in the second stop position, include a portion crossing coil 40 between third hold portion 221 and fourth hold portion 222 on a side opposite to these portions. Accordingly, coil 40 is held by strong magnetic attractive force in either of the first stop position and the second stop position.

In linear actuator 200 according to the second exemplary embodiment, both first U-shaped portion 260 and second U-shaped portion 270 of coil yoke 250 are in contact with first hold portion 214 and second hold portion 215, or third hold portion 221 and fourth hold portion 222, as support portions, in the first stop position and the second stop position. In the foregoing configuration, when coil 40 is in the first stop position, first U-shaped portion 260 and second U-shaped portion 270 crossing coil 40 from the mutually opposite directions include portions crossing coil 40 between first hold portion 214 and second hold portion 215 on the side opposite to first hold portion 214 and second hold portion 215. In addition, when coil 40 is in the second stop position as well, first U-shaped portion 260 and second U-shaped portion 270 include portions crossing coil 40 between third hold portion 221 and fourth hold portion 222 on the side opposite to third hold portion 221 and fourth hold portion 222. Accordingly, it is possible to generate strong magnetic attractive force for holding coil 40 in the first stop position and the second stop position.

3. Application Example of a Linear Actuator According to the Exemplary Embodiment An application example of a linear actuator according to the exemplary embodiment will be described. Specifically, an application example of linear actuator 200 according to the second exemplary embodiment to a lens barrel of a small-size camera will be described with reference to FIGS. 23 to 27.

Figure 23:
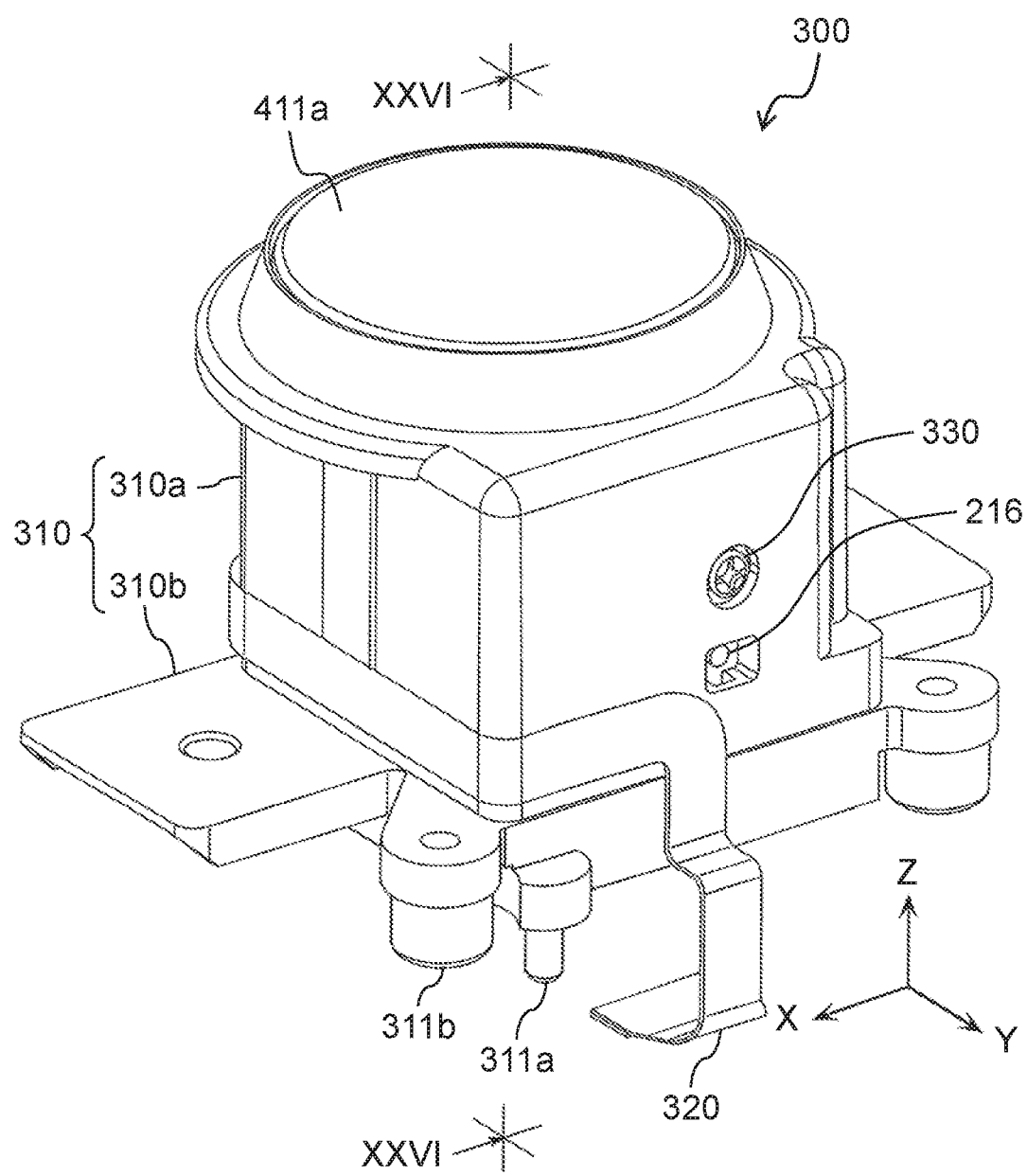
FIG. 23 is a perspective view of an application example of the linear actuator according to the second exemplary embodiment, illustrating an application example to a lens barrel of a small-size camera.
Figure 24:
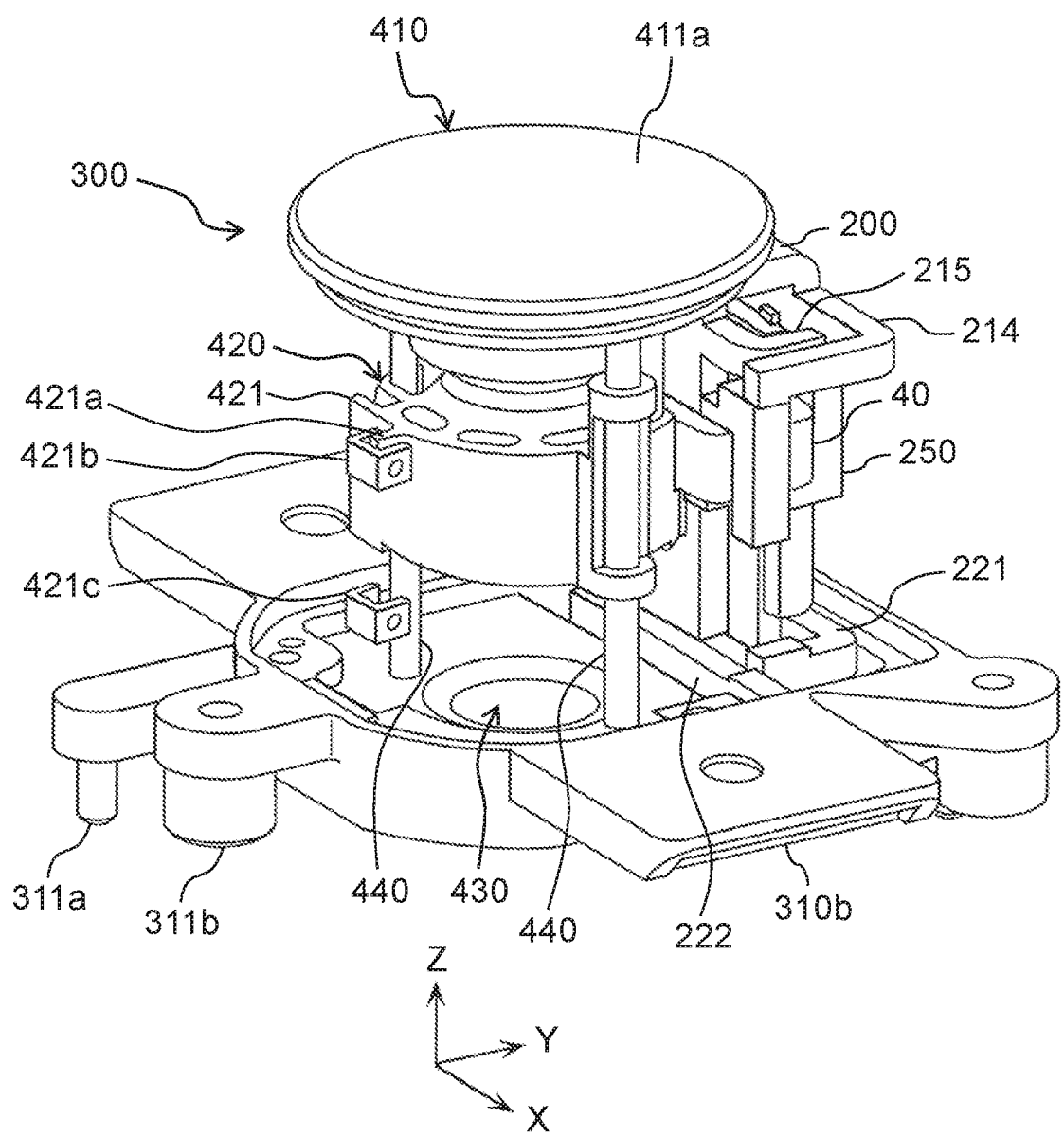
FIG. 24 is a perspective view of the lens barrel illustrated in FIG. 23 from which a side cover is removed as seen from another direction, illustrating the lens barrel in a telephoto-side state.
Figure 25:
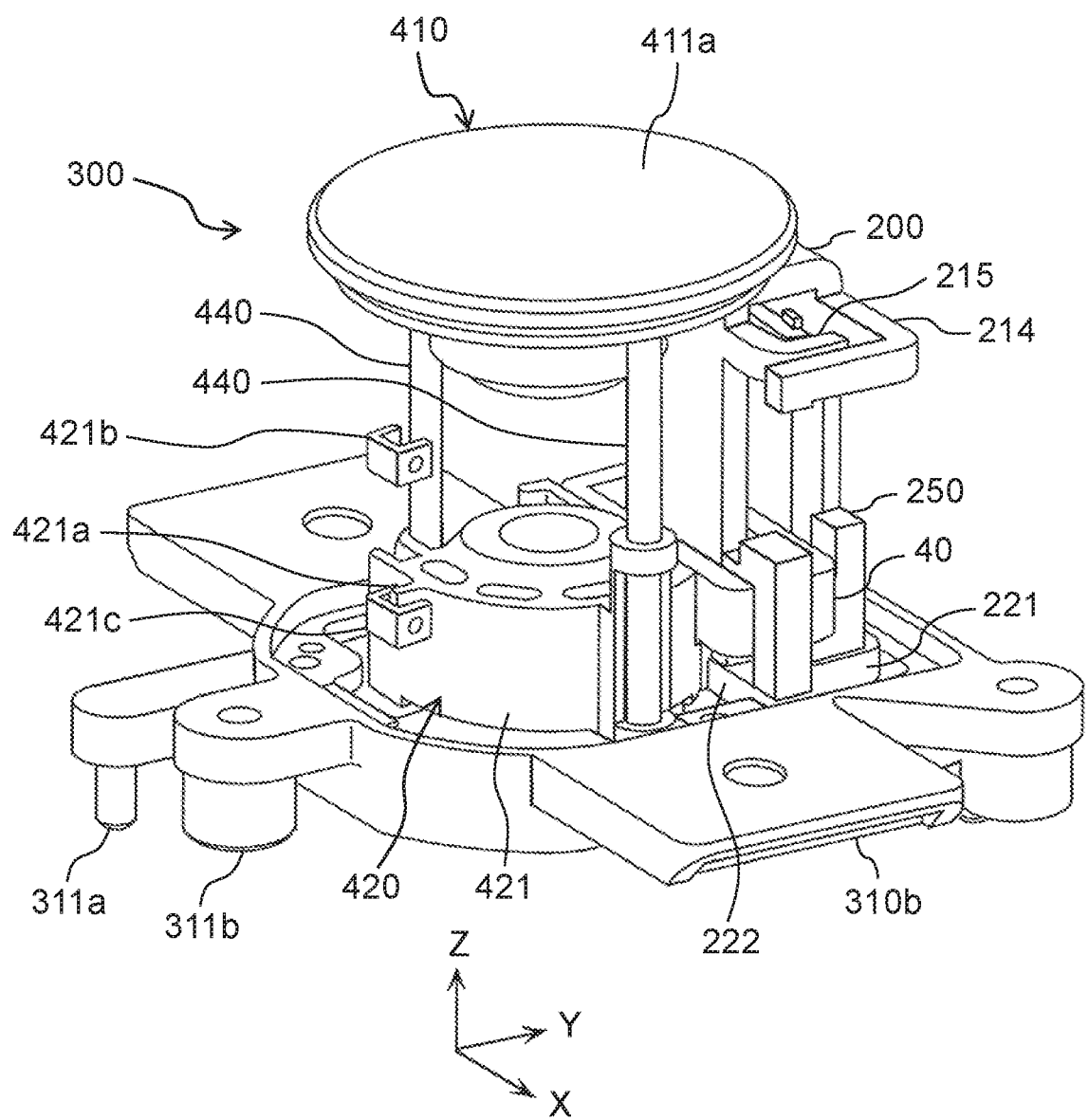
FIG. 25 is a perspective view of the lens barrel illustrated in FIG. 24 in a wide-side state.
Figure 26:
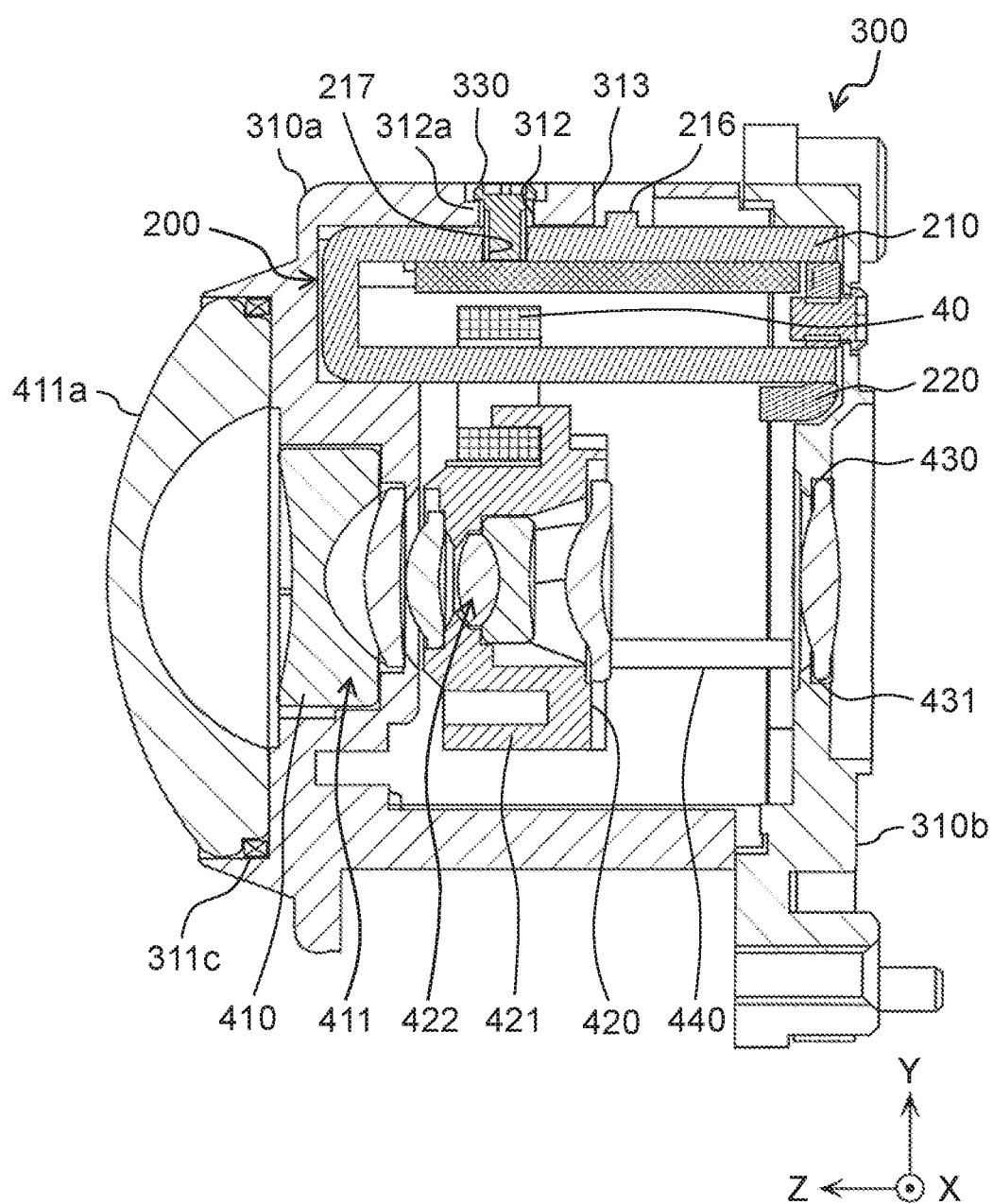
FIG. 26 is a cross-sectional side view of the lens barrel illustrated in FIG. 23 taken along an axial center of the lens barrel and the linear actuator as seen from a direction XXVI, illustrating the lens barrel in the telephoto-side state.
Figure 27:
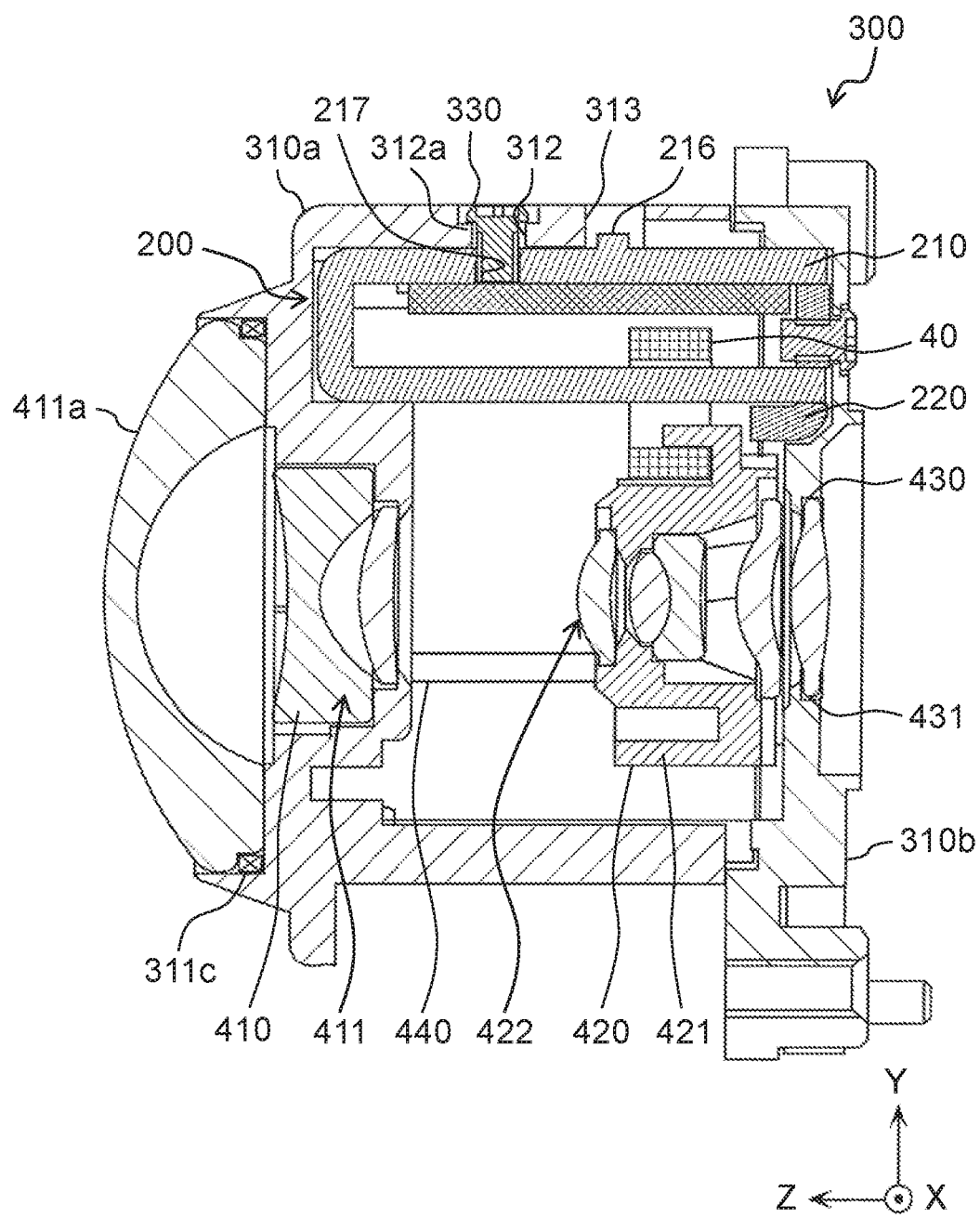
FIG. 27 is a cross-sectional side view of the lens barrel illustrated in FIG. 26 in the wide-side state.

FIG. 23 is a perspective view of an application example of linear actuator 200 according to the second exemplary embodiment, illustrating an application example to lens barrel 300 of a small-size camera. FIG. 24 is a perspective view of lens barrel 300 illustrated in FIG. 23 from which side cover 310a is removed as seen from another direction, illustrating lens barrel 300 in a telephoto-side state. FIG. 25 is a perspective view of lens barrel 300 illustrated in FIG. 24 in a wide-side state. FIG. 26 is a cross-sectional side view of lens barrel 300 illustrated in FIG. 23 taken along an axial center of lens barrel 300 and linear actuator 200 as seen from an X axis positive direction as direction XXVI, illustrating lens barrel 300 in the telephoto-side state. FIG. 27 is a cross-sectional side view of lens barrel 300 illustrated in FIG. 26 in the wide-side state.

X axis, Y axis, and Z axis illustrated in FIGS. 23 to 27 are set similarly to the X axis, the Y axis, and the Z axis illustrated in FIGS. 9 to 22 in relation to linear actuator 200 according to the second exemplary embodiment.

Referring to FIG. 23, in this example, lens barrel 300 constitutes a small-size lens barrel that can be installed in various in-vehicle cameras, small-size digital still cameras such as surveillance cameras, or digital video cameras. Lens barrel 300 includes bottomed cylindrical cover 310, first lens 411a exposed from cover 310, and narrow and long plate-shaped terminal 320. Cover 310 includes cylindrical side cover 310a and bottom cover 310b. Side cover 310a and bottom cover 310b are assembled together to form a storage space inside. Side cover 310a and bottom cover 310b are produced by resin molding, for example. A plurality of lens units, linear actuator 200, and others are provided in the storage space of cover 310. First lens 411a is a lens disposed on an outermost side among the plurality of lens units, and is exposed to outside from an opening in side cover 310a. Terminal 320 electrically connects an electrical component such as coil 40 in linear actuator 200 inside cover 310 and an electrical component outside cover 310.

Bottom cover 310b is attached to a substrate on which an imaging element not illustrated is disposed. Bottom cover 310b integrally includes a plurality of circular cylindrical pins 311a for positioning lens barrel 300 on the substrate of the imaging element and a plurality of leg portions 311b for fixing lens barrel 300 to the substrate of the imaging element.

The plurality of pins 311a performs positioning of lens barrel 300 to the imaging element by being inserted into positioning holes formed in the substrate of the imaging element. The plurality of leg portions 3111 has through holes into which tightening members such as screws are to be inserted. By leg portions 311b and the tightening members passing through the substrate of the imaging element, leg portions 311b are fixed to the substrate, and thus lens barrel 300 is fixed to the substrate.

Referring to FIGS. 24 to 27, linear actuator 200 is disposed on bottom cover 3101. Linear actuator 200 is fixed by positioning sub yoke 220 having third hold portion 221 and fourth hold portion 222 on bottom cover 310b.

Specifically, sub yoke 220 is fixed to bottom cover 310b by tightening members such as screws penetrating through sub yoke 220 and bottom cover 310b. Coil 40 of linear actuator 200 is movable in a direction coining closer to bottom cover 310b and in a direction separating from bottom cover 310b. For example, coil 40 is held in the first stop position as illustrated in FIG. 24 and is held in the second stop position as illustrated in FIG. 25.

Lens barrel 300 includes three lens units 410, 420, and 430 aligned in one line and a plurality of guide members 440 supporting and guiding second lens unit 420. Third lens unit 430 is embedded in bottom cover 310b. Third lens unit 430 includes lens 431 to reflect an image of light having entered from second lens unit 420 into lens 431 on the imaging element or like (not illustrated) disposed outside bottom cover 310b.

First lens unit 410 is disposed in the opening of side cover 310a and is fixed to side cover 310a. First lens unit 410 includes a plurality of lenses 411 and is disposed such that lenses 411 are opposed to lens 431 of third lens unit 430.

First lens 411a is positioned on the outermost side among the plurality of lenses 411. Around the opening in side cover 310a, annular seal material 311c is provided between first lens 411a and side cover 310a. Seal material 311c is produced from a flexible or elastic resin or like to seal between first lens 411a and side cover 310a in a water-tight or air-tight manner. This suppresses ingress of water, foreign matter, and others from outside into cover 310. Light from outside of cover 310 enters first lens unit 410.

Second lens unit 420 is disposed between first lens unit 410 and third lens unit 430. Second lens unit 420 is disposed such that the plurality of guide members 440 penetrates through unit cover 421 of second lens unit 420. Each of guide members 440 is formed from a bar-shaped member. Guide members 440 extend from bottom cover 310b along movement direction of coil 40 in linear actuator 200. In this example, two guide members 440 are disposed.

Second lens unit 420 is movable along an axis of the plurality of guide members 440. Accordingly, second lens unit 420 can be moved in a direction coming closer to bottom cover 310b and in a direction separating from bottom cover 310b. In addition, second lens unit 420 includes a plurality of lenses 422 and is disposed such that lenses 422 are opposed to lens 431 of third lens unit 430 and lens 411 of first lens unit 410. Further, unit cover 421 of second lens unit 420 is fixed to coil 40 such that second lens unit 420 is movable together with coil 40.

Accordingly, when coil 40 moves between the first stop position and the second stop position, second lens unit 420 moves together with coil 40 while being guided by guide members 440. Guide members 440 also guide the movement of coil 40. Coil 40 and second lens unit 420 can be stopped in a state held by magnetic attractive force in the two stop positions, that is, the first stop position as illustrated in FIGS. 24 and 26 and the second stop position as illustrated in FIGS. 25 and 27.

In lens barrel 300, when coil 40 is in the first stop position, second lens unit 420 is positioned near first lens unit 410. Accordingly, first lens unit 410 to third lens unit 430 can receive, out of light incident on lenses 411, light at as a relatively narrow viewing angle as 60° close to a human's static viewing angle, for example, and reflect the same on the imaging element (not illustrated). At this time, lens barrel 300 is in the telephoto-side state and acts as a telescopic lens.

When coil 40 is in the second stop position, second lens unit 420 is separated from first lens unit 410. Accordingly, first lens unit 410 to third lens unit 430 can receive, out of light incident on lenses 411, light at as a wide viewing angle as 180°, for example, and reflect the same on the imaging element not illustrated. At this time, lens barrel 300 is in the wide-side state and acts as a wide-angle lens.

Accordingly, lens barrel 300 acts as a bifocal type lens barrel that can selectively switch between two viewing angles, and hold the switched viewing angle and suppress fluctuation in viewing angle resulting from external force such as vibration and shock. The viewing angle set to lens barrel 300 is not limited to the foregoing example but may be any viewing angle.

Unit cover 421 has position detection projection 421a integrally formed. Position detection projection 421a protrudes from unit cover 421 sideways, that is, in a direction approximately perpendicular to the axial direction of guide members 440. Projection 421a moves together with coil 40 and unit cover 421.

Further, two position detection sensors 421b and 421c are disposed in cover 310. Each of position detection sensors 421b and 421c has a U outer shape. Position detection sensors 421b and 421c are electrically connected to terminal 320 and are configured to flow light, magnetism, and others between the U shapes.

Position detection sensors 421b and 421c detect interruption of light, magnetism, and others, specifically, interruption of light, magnetism, and others by projection 421a positioned between the U shapes, that is, detect projection 421a. Position detection sensors 421b and 421c are disposed to detect projection 421a when coil 40 is in the first stop position and the second stop position. Accordingly, position detection sensors 421b and 421c detect whether coil 40 is in the first stop position or the second position, that is, whether lens barrel 300 is in the telephoto-side state or wide-side state. Therefore, in lens barrel 300, a state of lens barrel 300 can be controlled and checked.

In addition, main yoke 210 of linear actuator 200 is not fixed to sub yoke 220 but is provided in such a manner as to be movable with respect to sub yoke 220 in the Z axis direction as the movement direction of coil 40. For example, main yoke 210 engages or fits with sub yoke 220 in such a manner capable of movement such as sliding. Main yoke 210 is fixed to side cover 310a in such a manner capable of position adjustment.

Referring to FIGS. 11 and 26, cylindrical projection 216 and female screw hole 217 are formed in first side yoke portion 211 of main yoke 210. First through hole 312 and second through hole 313 are formed in an angular cylindrical wall of side cover 310a at positions respectively corresponding to female screw hole 217 and projection 216.

Second through hole 313 is formed with an inner diameter larger than projection 216. By inserting projection 216 into second through hole 313, main yoke 210 is roughly positioned with respect to side cover 310a. Projection 216 and second through hole 313 are elements for roughly positioning main yoke 210.

First through hole 312 is shaped such that its inner diameter decreases with step portion 312a from outside to inside of cover 310. The inner diameter of first through hole 312 changes from step portion 312a. A portion of first through hole 312 with a smaller inner diameter constitutes an inner diameter of ring-shaped step portion 312a, which is larger than an inner diameter of female screw hole 217. A portion of first through hole 312 with a larger inner diameter constitutes an outer diameter of step portion 312a.

With first through hole 312 and female screw hole 217 aligned with each other, main yoke 210 is fixed to side cover 310a by screw 330 as a tightening member. At this time, a male screw shaft of screw 330 with a male screw passes through first through hole 312 and screws into female screw hole 217, and a diameter-increased head of screw 330 is larger than the inner diameter of step portion 312a and engages with step portion 312a. The smaller inner diameter of first through hole 312 is larger than an outer diameter of the male screw shaft of screw 330, which forms a gap between an inner surface of first through hole 312 and the male screw shaft of screw 330.

Accordingly, when screw 330 is loosened, the gap permits screw 330 to move together with main yoke 210 in first through hole 312 in a radial direction of first through hole 312. At this time, main yoke 210 can move with respect to side cover 310a and sub yoke 220 in the Z axis direction and in an outer peripheral direction of side cover 310a.

This allows fine adjustments of a distance between the first stop position and the second stop position of coil 40 in linear actuator 200. Accordingly, this allows fine adjustments of the stop position of second lens unit 420 to first lens unit 410 and third lens unit 430, that is, fine adjustments of a focal distance between the lens units. By tightening screw 330, main yoke 210 is fixed to side cover 310a, that is, cover 310 at the adjusted position.

Further, an adhesive is injected into first through hole 312 and second through hole 313 to fix main yoke 210 and cover 310 firmly to each other. The shape of first through hole 312 may be elongated in the longitudinal direction along the Z axis direction.

This makes it possible to extend the adjustable width of main yoke 210 in the Z axis direction, which increases an adjustable margin of the focal distance between the lens units.

As described above, linear actuator 200 further includes cover 310 containing coil 40, coil yoke 250, main yoke 210, and sub yoke 220, and screw 330 as a tightening member for fixing main yoke 210 to cover 310. Main yoke 210 is provided to be movable with respect to sub yoke 220, and cover 310 has first through hole 312 through which the shaft of screw 330 passes. There is formed a gap between the inner surface of first through hole 312 and the shaft of screw 330 to permit the movement of screw 330 together with main yoke 210.

In the foregoing configuration, when fixation to cover 310 by screw 330 is loosened, main yoke 210 can move relatively to cover 310 and sub yoke 220 separately from sub yoke 220 by the thickness of the gap. This allows position adjustment of main yoke 210 with respect to cover 310 and sub yoke 220. This also allows adjustment of the distance between the two stop positions of coil 40.

4. Modification Example 4-1. Linear Actuator According to Modification Example

Linear actuator 500 according to a modification example of the second exemplary embodiment will be described with reference to FIG. 28.

Figure 28:
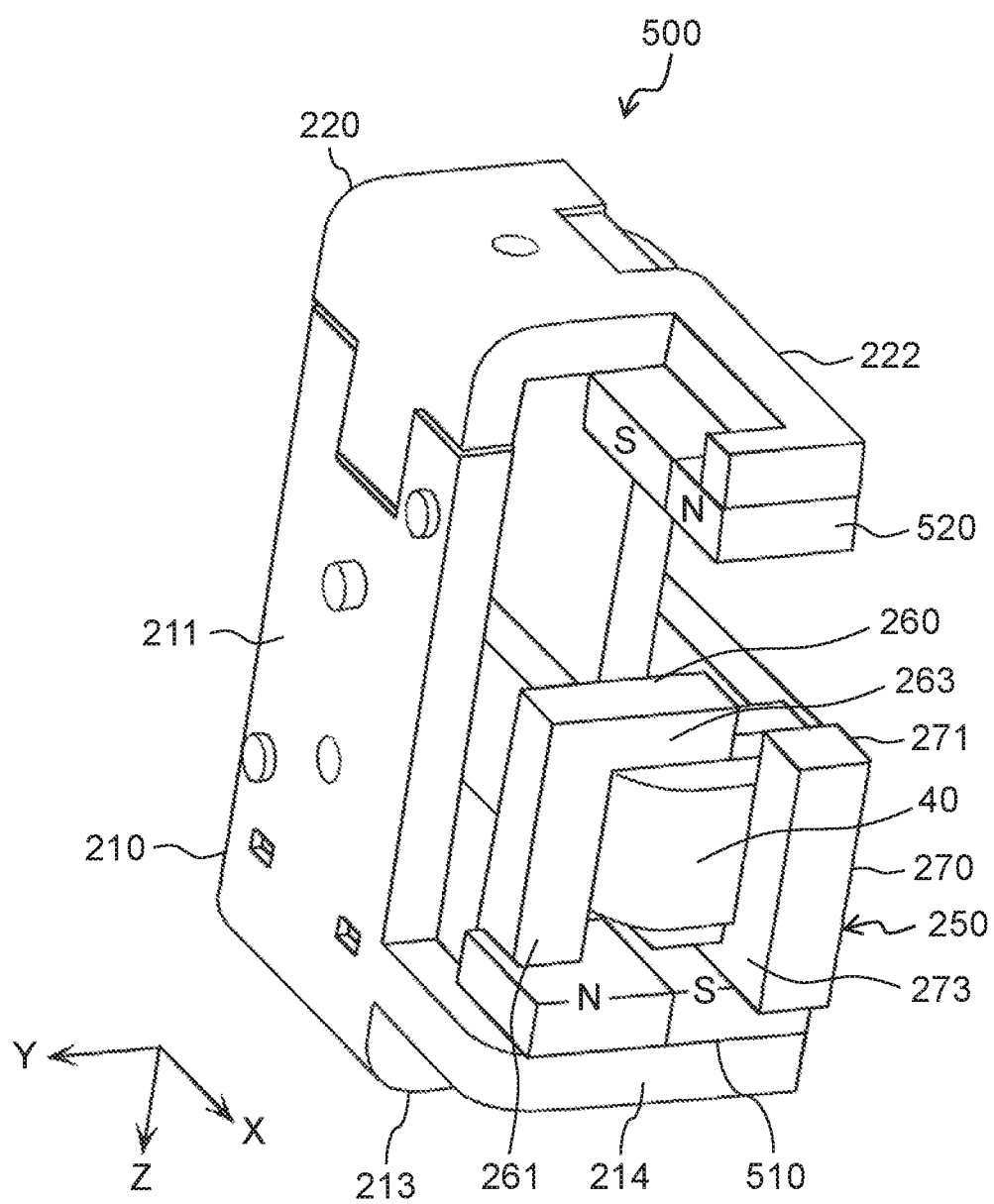
FIG. 28 is a schematic perspective view of an outer appearance of a linear actuator according to a modification example of the second exemplary embodiment.

FIG. 28 is a schematic perspective view of an outer appearance of linear actuator 500 according to the modification example of the second exemplary embodiment. Linear actuator 500 according to the modification example is configured such that hold magnets are disposed on the hold portions of linear actuator 200 according to the second exemplary embodiment at positions on the support end portions. Linear actuator 500 according to the modification example includes main yoke 210, sub yoke 220, magnet 30, coil 40, and coil yoke 250 as with linear actuator 200 according to the second exemplary embodiment. FIG. 28 illustrates linear actuator 500 with sub yoke 220 positioned above main yoke 210 as in FIG. 13.

In linear actuator 500, main yoke 210 has first hold portion 214 but does not have second hold portion 215. First hold portion 214 does not have protruding first support end portion 214a. Linear actuator 500 includes first hold magnet 510 on a surface of first hold portion 214 on a coil 40 side.

As with magnet 30, first hold magnet 510 has N and S magnetic polarities and is formed from a permanent magnet, for example. First hold magnet 510 extends over regions corresponding first support end portion 214a and second support end portion 215a of linear actuator 200 according to the second exemplary embodiment. Further, first hold magnet 510 has the S magnetic polarity in the region corresponding to first support end portion 214a and has the N magnetic polarity in the region corresponding to second support end portion 215a. In this case, first hold magnet 510 is an example of a magnetic body hold magnet.

First hold magnet 510 can hold coil yoke 250 by stronger magnetic attractive force than first support end portion 214a and second support end portion 215a with magnetic polarities formed by the magnetic field of magnet 30 in linear actuator 200 according to the second exemplary embodiment.

In linear actuator 500, sub yoke 220 has fourth hold portion 222 but does not have third hold portion 221. Fourth hold portion 222 does not have protruding fourth support end portion 222a but has an L shape. Linear actuator 500 includes second hold magnet 520 on a surface of fourth hold portion 222 on a coil 40 side. As with magnet 30, second hold magnet 520 has N and S magnetic polarities and is formed from a permanent magnet, for example.

Second hold magnet 520 extends over in regions corresponding to third support end portion 221a and fourth support end portion 222a in linear actuator 200 according to the second exemplary embodiment. Further, second hold magnet 520 has the S magnetic polarity in the region corresponding to third support end portion 221a and has the N magnetic polarity in the region corresponding to fourth support end portion 222a. In this case, second hold magnet 520 is an example of a magnetic body hold magnet.

Second hold magnet 520 can hold coil yoke 250 by stronger magnetic attractive force than third support end portion 221a and fourth support end portion 222a with magnetic polarities formed by the magnetic field of magnet 30 in linear actuator 200 according to the second exemplary embodiment.

In linear actuator 500 according to the present modification example, each of first hold magnet 510 and second hold magnet 520 is formed from one magnet but may be formed from two magnets. In this case, the two magnets are disposed such that magnetic polarity faces of the two magnets facing coil 40 are opposite in magnetic polarity.

In linear actuator 500 according to the present modification example, main yoke 210 does not have second hold portion 215, but may have second hold portion 215. Sub yoke 220 does not have third hold portion 221, but may have third hold portion 221. In this case, second hold portion 215 and third hold portion 221 may also support first hold magnet 510 and second hold magnet 520.

In linear actuator 500 according to the present modification example, first hold magnet 510 and second hold magnet 520 are provided so that first hold portion 214 and fourth hold portion 222 may not be produced from a magnetic material.

4-2. Advantageous Effects

According to linear actuator 500 in the modification example as described above, it is possible to obtain the same advantageous effects as those of the linear actuators in the first and second exemplary embodiments. Linear actuator 500 according to the modification example includes first hold magnet 510 and second hold magnet 520 as magnetic body hold magnets in first hold portion 214 and fourth hold portion 222 as support portions.

In the foregoing configuration, the magnetic attractive force in first hold portion 214 and fourth hold portion 222 can be adjusted by first hold magnet 510 and second hold magnet 520. Accordingly, linear actuator 500 makes it possible to adjust performance in holding coil 40 as appropriate regardless of the magnetic field of magnet 30.

Other Exemplary Embodiments

In exemplification of the technique in the present disclosure, the exemplary embodiments and modification example have been described so far. However, the technique in the present disclosure is not limited to them but is also applicable to exemplary embodiments with changes, replacements, additions, omissions, or the like made as appropriate. Constituent elements of the exemplary embodiments and modification example, and embodiments described below can be combined together to form new exemplary embodiments. Other exemplary embodiments will be described below.

In the linear actuators according to the exemplary embodiments and the modification example, magnet 30 is disposed at first side yoke portion 11, 211 of main yoke 10, 210, but magnet 30 is not limited to this disposition.

Magnet is provided at least to form a magnetic field between first side yoke portion 11, 211 and second side yoke portion 12, 212. In this case, one or more magnets can be provided. For example, magnets may be provided at second side yoke portion 12, 212 or may be provided at both first side yoke portion 11, 211 and second side yoke portion 12, 212.

In the linear actuators according to the exemplary embodiments and the modification example, the yokes are formed from main yoke 10, 210 and sub yoke 20, 220, but the yokes are not limited to this configuration.

For example, main yoke 10, 210 and sub yoke 20, 220 may be formed from one member. The configurations of the main yoke and the sub yoke are not limited to the configurations of main yoke 10, 210 and sub yoke 20, 220. For example, first side yoke portion 211 may be formed integrally with first hold portion 214 and third hold portion 221, and second side yoke portion 212 may be formed integrally with second hold portion 215 and fourth hold portion 222. The sub yoke may include part of at least one of first side yoke portion 11, 211 and second side yoke portion 12, 212. Each of the main yoke and the sub yoke may include one or other of first side yoke portion 11, 211 and second side yoke portion 12, 212 only.

in the linear actuators according to the exemplary embodiments and the modification example, the configuration of the coil yoke is not limited to the configuration of coil yoke 250.

The coil yoke is configured such that, when coil 40 is in the first stop position and the second stop position, the direction of flow of magnetic flux formed in the coil yoke is opposite between the presence and absence of application of an electric current to coil 40.

In the linear actuators according to the exemplary embodiments and the modification example, magnet 30 may be disposed such that the N pole and the S pole are reversed in orientation. Specifically, magnet 30 may be disposed such that the N pole of magnet 30 is in abutment with first side yoke portion 11, 211 and the S pole of magnet 30 is opposed to second side yoke portion 12, 212.

At this time, controlling the direction of an electric current applied to coil 40 to be opposite to the case of the exemplary embodiments and the modification example allows the linear actuator to operate in the same manner as in the exemplary embodiments and the modification example. Otherwise, setting a winding direction of the winding wire of coil 40 to be opposite to the case of the exemplary embodiments and the modification example allows the linear actuator to operate in the same manner as in the exemplary embodiment and the modification example without having to change the direction of an electric current applied to coil 40.

In the descriptions of the exemplary embodiments and the modification example, the ding direction of the winding wire of coil 40 is not specified. However, when the winding wire is wound clockwise in the exemplary embodiments and modification example as seen from the Z axis positive direction to the Z axis negative direction, for example, the winding wire is to be wound counterclockwise, and the same can be said to the opposite case. As described above, the orientation of magnet 30, the direction of an electric current applied to coil 40, and the winding direction of the winding wire of coil 40 can be arbitrarily combined to implement the operations of the linear actuators in the exemplary embodiments and the modification example.

The linear actuators according to the exemplary embodiments and the modification example are applied to a lens unit of a lens barrel in a camera. However, the linear actuators are not limited to this application but are applicable to any targets linearly moving.

In exemplification of the technique in the present disclosure, the exemplary embodiments have been described so far. For this purpose, the accompanying drawings and the detailed descriptions have been provided.

Therefore, the constituent elements illustrated in the accompanying drawings and described in detail can include not only constituent elements that are essential for solving the issue but also constituent elements that are not essential for solving the issue but are intended for exemplification of the foregoing technique. Accordingly, the non-essential constituent elements should not be recognized as essential by the illustration in the accompanying drawings and the detailed descriptions.

The exemplary embodiments are intended to exemplify the technique in the present disclosure and thus can be changed, replaced, added, or omitted in various manners within the scope of the claims and its equivalent scope.

INDUSTRIAL APPLICABILITY

As described above, the present disclosure is useful to devices that linearly move to a target object.

REFERENCE MARKS IN THE DRAWINGS 10, 210: main yoke
11, 211: first side yoke portion (first yoke)
12, 212: second side yoke portion (second yoke)
14, 214: first hold portion (support portion, first support portion)
15, 215: second hold portion (support portion, second support portion)
20, 220: sub yoke
30: magnet (stator)
40: coil (mover)
50, 250: coil yoke (magnetic body)
100, 200, 500: linear actuator
221: third hold portion (third support portion)
222: fourth hold portion (fourth support portion)
260: first U-shaped portion (first magnetic portion)
270: second U-shaped portion (second magnetic portion)
310: cover
312: first through hole (through hole)
330: screw (tightening member)
510: first hold magnet (magnetic body hold magnet)
520: second hold magnet (magnetic body hold magnet)

The invention claimed is:

1. A linear actuator comprising:
a coil that is movably provided, the coil movable along an axis and having an interior forming an inner opening and an exterior disposed radially beyond the interior;
a magnetic body that is provided to move integrally with the coil along the axis;
a first yoke that extends outside of the coil along the axis;
a second yoke that is surrounded by the coil, extends through the inner opening along the axis, and is opposed to the first yoke; and
a magnet that forms a magnetic field between the first yoke and the second yoke, wherein
the magnetic body includes a first leg portion that extends along the axis through the inner opening, a second leg portion that extends along the axis and is disposed radially beyond the exterior, and a third portion extending therebetween, and
at least one of the first yoke and the second yoke has a support portion, the support portion magnetically attracts at least one of a first end portion of the first leg portion and a second end portion of the second leg portion of the magnetic body in a stop state and having a magnetic polarity.

2. The linear actuator according to claim 1, wherein
the first yoke and the second yoke respectively have a first support portion and a second support portion as the support portion, and
the first end portion is magnetically held by the first support portion, and the second end portion is magnetically held by the second support portion.

3. The linear actuator according to claim 2, wherein
the first support portion and the second support portion have magnetic polarities opposite to each other, and the magnetic body is magnetically held by the first support portion and the second support portion and is configured to form magnetic flux that crosses the coil from outside of the coil and inside of the coil passing through the magnetic body or to form magnetic flux that crosses the coil from inside of the coil and outside of the coil passing through the magnetic body.

4. The linear actuator according to claim 3, wherein
the first yoke and the second yoke respectively have a third support portion and a fourth support portion as the support portion at positions opposite to the first support portion and the second support portion as seen in a movement direction of the coil, and
the magnetic body is magnetically held by the first support portion and the second support portion in a first stop position as one stop position as seen in the movement direction of the coil, and is magnetically held by the third support portion and the fourth support portion in a second stop position as another stop position as seen in the movement direction of the coil.

5. The linear actuator according to claim 4, wherein
the third support portion and the fourth support portion have magnetic polarities opposite to each other, and
the magnetic body is magnetically held by the third support portion and the fourth support portion and is configured to form magnetic flux that crosses the coil from outside of the coil and inside of the coil passing through the magnetic body or to form magnetic flux that crosses the coil from inside of the coil and outside of the coil passing through the magnetic body.

6. The linear actuator according to claim 5, wherein
the first yoke and the second yoke are connected to each other,
the first yoke and the second yoke are formed by a main yoke that has the first support portion and the second support portion and has the magnet disposed and a sub yoke that has the third support portion and the fourth support portion, and
the main yoke and the sub yoke form members separate from each other and are connected to each other.

7. The linear actuator according to claim 4, wherein
the first yoke and the second yoke are connected to each other,
the first yoke and the second yoke are formed by a main yoke that has the first support portion and the second support portion and has the magnet disposed and a sub yoke that has the third support portion and the fourth support portion, and
the main yoke and the sub yoke form members separate from each other and are connected to each other.

8. The linear actuator according to claim 7, further comprising:
a cover that contains the coil, the magnetic body, the main yoke, and the sub yoke; and
a tightening member that fixes the main yoke to the cover, wherein
the main yoke is provided to be movable with respect to the sub yoke,
the cover has a through hole through which a shaft of the tightening member passes, and
there is formed a gap that permits movement of the tightening member together with the main yoke between an inner surface of the through hole and the shaft of the tightening member.

9. The linear actuator according to claim 1, wherein the magnetic body includes a first magnetic portion that traverses the coil from outside of the coil to inside of the coil at one end portion as seen along the axis of the coil and a second magnetic portion that traverses the coil from outside of the coil to inside of the coil at another end portion, opposite the one end portion, as seen along the axis of the coil.

10. The linear actuator according to claim 9, wherein
each of the first magnetic portion and the second magnetic portion has a U shape, and
the first magnetic portion and the second magnetic portion are connected together to form the U shapes inversed from each other.

11. The linear actuator according to claim 9, wherein both the first magnetic portion and the second magnetic portion are magnetically held by the support portion in the first stop position and the second stop position.

12. The linear actuator according to claim 1, wherein
the magnet is disposed at least at one of the first yoke and the second yoke between the first yoke and the second yoke, and
the first yoke and the second yoke are magnetically connected together.

13. The linear actuator according to claim 1, further comprising a magnetic body hold magnet at the support portion.

14. A lens barrel comprising:
a lens unit that holds at least one lens; and
the linear actuator according to claim 1,
wherein the lens unit is moved by the linear actuator.

15. A camera comprising:
a lens unit that holds at least one lens;
an imaging element for receiving light passing through the lens, and
the linear actuator according to claim 1,
wherein the lens unit is moved by the linear actuator.

16. A linear actuator comprising:
a coil that is movably provided;
a magnetic body that is provided to move integrally with the coil;
a first yoke that extends outside of the coil;
a second yoke that is surrounded by the coil, extends, and is opposed to the first yoke; and
a magnet that forms a magnetic field between the first yoke and the second yoke, wherein
the magnetic body extends along an axis of the coil,
at least one of the first yoke and the second yoke has a support portion, the support portion supporting the magnetic body in a stop state and having a magnetic polarity,
the magnetic body extends to cross the coil from outside of the coil to inside of the coil,
the first yoke and the second yoke respectively have a first support portion and a second support portion as the support portion,
the magnetic body is attracted and held by the first support portion and the second support portion by being in contact with the first support portion and the second support portion,
the first yoke and the second yoke respectively have a third support portion and a fourth support portion as the support portion at positions opposite to the first support portion and the second support portion as seen in a movement direction of the coil, and
the magnetic body is magnetically held by the first support portion and the second support portion in a first stop position as one stop position as seen in the movement direction of the coil, and is magnetically held by the third support portion and the fourth support portion in a second stop position as another stop position as seen in the movement direction of the coil.

17. The linear actuator according to claim 16, wherein
the third support portion and the fourth support portion have magnetic polarities opposite to each other, and
the magnetic body is magnetically held by the third support portion and the fourth support portion and is configured to form magnetic flux that crosses the coil from outside of the coil and inside of the coil passing through the magnetic body or to form magnetic flux that crosses the coil from inside of the coil and outside of the coil passing through the magnetic body.

18. The linear actuator according to claim 17, wherein
the first yoke and the second yoke are connected to each other,
the first yoke and the second yoke are formed by a main yoke that has the first support portion and the second support portion and has the magnet disposed and a sub yoke that has the third support portion and the fourth support portion, and
the main yoke and the sub yoke form members separate from each other and are connected to each other.

19. The linear actuator according to claim 16, wherein
the first yoke and the second yoke are connected to each other,
the first yoke and the second yoke are formed by a main yoke that has the first support portion and the second support portion and has the magnet disposed and a sub yoke that has the third support portion and the fourth support portion, and
the main yoke and the sub yoke form members separate from each other and are connected to each other.

20. The linear actuator according to claim 19, further comprising:
a cover that contains the coil, the magnetic body, the main yoke, and the sub yoke; and
a tightening member that fixes the main yoke to the cover, wherein
the main yoke is provided to be movable with respect to the sub yoke,
the cover has a through hole through which a shaft of the tightening member passes, and
there is formed a gap that permits movement of the tightening member together with the main yoke between an inner surface of the through hole and the shaft of the tightening member.

21. A linear actuator comprising:
a coil that is movably provided, the coil movable along an axis and having an interior forming an inner opening and an exterior disposed radially beyond the interior;
a magnetic body that is provided to move integrally with the coil along the axis;
a first yoke that extends outside of the coil along the axis;
a second yoke that is surrounded by the coil, extends through the inner opening along the axis, and is opposed to the first yoke; and
a magnet that forms a magnetic field between the first yoke and the second yoke, wherein
the magnetic body includes a) a leg portion that extends along the axis and b) another portion that extends axially from the leg portion and traverses the coil from outside of the coil to inside of the coil at one end portion of the coil as seen along the axis of the coil, and
at least one of the first yoke and the second yoke has a support portion, the support portion magnetically attracts an end portion of the leg portion of the magnetic body in a stop state and having a magnetic polarity.

\* \* \* \* \*